United States Patent
Sekiya et al.

(10) Patent No.: US 7,960,443 B2
(45) Date of Patent: Jun. 14, 2011

(54) EXTRUDED STYRENIC RESIN FOAM AND METHOD FOR PRODUCING THE SAME

(75) Inventors: Shunsuke Sekiya, Utsunomiya (JP);
Atsushi Taira, Utsunomiya (JP);
Noritoshi Nishiyama, Utsunomiya (JP);
Naochika Kogure, Utsunomiya (JP)

(73) Assignee: JSP Corporation, Tokyo (JP)

( * ) Notice: Subject to any disclaimer, the term of this patent is extended or adjusted under 35 U.S.C. 154(b) by 473 days.

(21) Appl. No.: 12/081,376

(22) Filed: Apr. 15, 2008

(65) Prior Publication Data

US 2009/0069455 A1 Mar. 12, 2009

Related U.S. Application Data

(60) Provisional application No. 60/935,989, filed on Sep. 10, 2007.

(51) Int. Cl.
*C08J 9/228* (2006.01)
*C08J 9/35* (2006.01)
(52) U.S. Cl. .......... 521/79; 521/138; 521/139; 521/146; 521/149; 525/222; 525/241; 525/227; 525/244
(58) Field of Classification Search .............. 521/79, 521/139, 146, 138, 149; 525/222, 241, 227, 525/244
See application file for complete search history.

(56) References Cited

U.S. PATENT DOCUMENTS

| 6,315,932 | B1 | 11/2001 | Fujiwara et al. |
| 6,696,504 | B1 | 2/2004 | Hayashi et al. |

FOREIGN PATENT DOCUMENTS

| EP | 0 773 252 A1 | | 5/1997 |
| EP | 0 978 363 A1 | | 2/2000 |
| JP | 01121346 A | * | 5/1989 |
| JP | 05271456 A | * | 10/1993 |
| JP | 2001098097 A | * | 4/2001 |
| JP | A 2004-196907 | | 7/2004 |
| JP | A-2004-331843 | | 11/2004 |
| JP | A-2006-028292 | | 2/2006 |
| JP | A 2006-131719 | | 5/2006 |
| JP | A 2006-131757 | | 5/2006 |
| WO | WO 99/33625 A1 | | 7/1999 |
| WO | WO 99/54390 A1 | | 10/1999 |
| WO | WO 02/051918 A1 | | 7/2002 |

* cited by examiner

*Primary Examiner* — Irina S Zemel
(74) *Attorney, Agent, or Firm* — Oliff & Berridge, PLC

(57) ABSTRACT

The present invention relates to an extruded styrenic resin foam and a method for producing the same, wherein a base resin composing the extruded styrenic resin foam is a styrenic resin mixture of a styrene-(meth)acrylic ester copolymer, or a combination of a styrene-(meth)acrylic ester copolymer and polymethyl methacrylate, and a styrenic resin except the styrene-(meth)acrylic ester copolymer, and the styrenic resin mixture contains a (meth)acrylic ester component at a ratio of 4 to 45% by weight with reference to the styrenic resin mixture. The present invention provides an extruded styrenic resin foam having an apparent density of 20 to 60 kg/m$^3$, a thickness of 10 to 150 mm, and a low thermal conductivity, and keeping excellent heat insulation performance over a long period of time and flame retardancy, even when the styrenic resin extruded foam is foamed using a blowing agent having an ozone depleting potential of 0 (zero) and a low global warming potential.

22 Claims, 4 Drawing Sheets

EXTRUDED STYRENIC RESIN FOAM AND METHOD FOR PRODUCING THE SAME

This nonprovisional application claims the benefit of U.S. Provisional Application No. 60/935,989, filed Sep. 10, 2007.

BACKGROUND OF THE INVENTION

1. Field of the Invention

The present invention relates to an extruded styrenic resin foam and a method for producing the same, wherein the base resin composing the styrenic resin extruded foam is a styrenic resin mixture composed of a styrene-(meth)acrylic ester copolymer, or a combination of a styrene-(meth)acrylic ester copolymer and polymethyl methacrylate, and a styrenic resin, and the styrenic resin mixture contains a (meth)acrylic ester component at a ratio of 4 to 45% by weight with reference to the styrenic resin mixture. The present invention provides an extruded styrenic resin foam having an apparent density of 20 to 60 kg/m$^3$, a thickness of 10 to 150 mm, and a low thermal conductivity, and keeping excellent heat insulation performance over a long period of time and flame retardancy, even when the extruded styrenic resin foam is foamed using a blowing agent having an ozone depleting potential of 0 (zero) and a low global warming potential.

2. Relevant Prior Art

Styrenic resin foams have excellent heat insulating properties and favorable mechanical strength. Therefore, styrenic resin foams in the form of board having a certain width have been widely used as insulating materials. Such a foam is usually produced as follows: a styrenic resin material is heated and molten in an extruder, the melt is mixed with a physical blowing agent to make a foamable molten resin composition, the foamable molten resin composition is extruded and foamed through, for example, a slit die provided at the tip of the extruder into a low-pressure region, and, as necessary, the foam is molded by a shaping device connected to the outlet of the die.

Chlorofluorocarbons (hereinafter referred to as CFCs) such as dichlorodifluoromethane has been widely used as blowing agents for producing the styrenic resin extruded foam. However, CFCs are prone to deplete the ozone layer, so that CFCs have recently been replaced with hydrogenated chlorofluorocarbons (hereinafter referred to as HCFCs) having low ozone depleting potentials. However, the ozone depleting potentials of HCFCs are not 0 (zero), so HCFCs are not without risk of depleting the ozone layer. Accordingly, hydrofluorocarbons (hereinafter referred to as HFCs) having an ozone depleting potential of 0 (zero) and no chlorine atom within the molecule thereof have been studied for possible use as blowing agents.

HFCs are preferred from the viewpoint of ozone depleting potentials, but HFCs have high global warming potentials, so that there is still room for improvement from the viewpoint of global environmental protection. Therefore, methods for producing styrenic resin foams using an eco-friendly blowing agent having an ozone depleting potential of 0 (zero) and a low global warming potential have been studied.

For example, isobutane and isopentane used as blowing agents for making dstyrenic resin foams have an ozone depleting potential of 0 (zero) and low global warming potentials, so that they are favorable blowing agents from the viewpoint of global environmental protection. However, isobutane and isopentane in gaseous form have a lower thermal conductivity than air, but have a higher thermal conductivity than chlorofluorocarbons such as CFCs, HCFCs, and HFCs. Therefore, a form containing isobutane or isopentane cannot achieve equivalent heat insulating properties to foam containing an equimolar amount of a chlorofluorocarbon. The heat insulating properties can be improved by increasing the content of isobutane or isopentane in the foam, but isobutane and isopentane are so flammable that it is very difficult to impart sufficient flame retardancy to the resultant foam. The permeation rates of isobutane and isopentane through a styrenic resin are much lower than that of air, but higher than that of CFCs, so that isobutane and isopentane gradually dissipate from the foam. On this account, the thermal conductivity of the foam gradually increases. Accordingly, it has been difficult to produce a foam having long-lasting heat insulating properties and flame retardancy with the use of isobutane or isopentane as a blowing agent.

It has been also studied to use carbon dioxide and water, which have an ozone depleting potential of 0 (zero) and a lower global warming potential than hydrocarbon, as the main ingredients of a blowing agent, but carbon dioxide and water quickly dissipate from the foam, so that the resultant foam cannot achieve high heat insulating properties.

As a method for producing an extruded styrenic resin foam having excellent environmental suitability and keeping high heat insulation performance and high strength, for example, WO 99/33625 discloses a method for producing a foam having excellent heat insulating properties and excellent compression strength by extrusion foaming, wherein a blowing agent is injected into a styrenic resin, and the blowing agent is as environmentally safe as possible, and is composed mainly of less than 40% by weight and 5% by weight or more of ether, and more than 60% by weight and 95% by weight or less of a saturated hydrocarbon having 3 to 5 carbon atoms, which may be partially replaced with a hydrofluorocarbon, with reference to the whole amount of the blowing agent.

WO 99/54390 discloses a method for producing a foam having a cell structure containing large and small cells, and specified the cell form through the use of a blowing agent composed of 40% by weight or more and 85% by weight or less of one ether selected from dimethyl ether, methyl ethyl ether, methyl ethyl ether, and diethyl ether, and 15% by weight or more and 60% by weight or less of one saturated hydrocarbon having 3 to 5 carbon atoms with reference to the whole amount of the blowing agent.

WO 02/051918A1 discloses a foam and a method producing the same, wherein the blowing agent contains at least one saturated hydrocarbon having 3 to 5 carbon atoms, and at least one compound selected from a group consists of halogen flame retardants, tetrazole compounds, specific nitrogen-containing compounds, metal borates, and boron oxide, and the cell structure composing the foam satisfies a cell anisotropy represented by a specific formula.

However, the foams produced by the above-described methods exhibits high heat insulating properties immediately after the production, but their heat insulation performance gradually deteriorates as the hydrocarbon gradually dissipates from the foams. Therefore, they still have problems in maintenance of high heat insulation performance over a long period of time.

Japanese Patent Application Laid-Open (JP-A) Nos. 2006-131719 and 2006-131757 proposed methods including addition of a gas barrier resin to a styrenic resin. JP-A-2006-131719 proposed a method including addition of a nitrile resin as a gas barrier resin. JP-A-2006-131757 proposed a method for extrusion foaming, wherein a vinyl alcohol resin is used as a gas barrier resin, and the resin is extruded and foamed in the presence of a compound having a molecular weight of 1000 or less and one or more hydroxy groups within one molecule thereof.

Gas barrier resins prevent the dissipation of low thermal conductive blowing agents such as isobutane from foams, and retard the inflow of air into foam cells thereby improving heat insulating properties immediately after the extrusion. However, because gas barrier resins inhibit foaming, it is difficult to produce foams with low apparent density. Even if isobutane slowly dissipates from a foam and the inflow rate of air into the cells is low, the content of isobutane decreases and air flows in the cells after a lapse of long period, which hinders the maintenance of heat insulating properties over a long period of time.

Various methods for producing styrenic resin extruded foams are reported, wherein a blowing agent having an ozone depleting potential of 0 (zero) and a low global warming potential is used to produce an extruded styrenic resin foam having excellent flame retardancy and providing a low thermal conductivity and excellent heat insulating properties over a long period of time.

The inventors have extensively studied the method for producing an extruded styrenic resin foam having excellent flame retardancy and keeping a low thermal conductivity and excellent heat insulating properties over a long period of time, even when a blowing agent having an ozone depleting potential of 0 (zero) and a low global warming potential is used, and have found that an extruded styrenic resin foam providing a low thermal conductivity and excellent heat insulating properties over a long period of time is produced with the use of a styrenic resin mixture composed of a styrene-(meth)acrylic ester copolymer, or a combination of a styrene-(meth)acrylic ester copolymer and polymethyl methacrylate, and a styrenic resin (meth) acrylic ester as the base resin composing the extruded styrenic resin foam, wherein the styrenic resin mixture contains a (meth)acrylic ester component at a specific ratio.

SUMMARY OF THE INVENTION

The present invention provides an extruded styrenic resin foam having a low thermal conductivity and keeping excellent heat insulating properties over a long period of time and flame retardancy, even when the extruded styrenic resin foam is foamed using a blowing agent having an ozone depleting potential of 0 (zero) and a low global warming potential.

The present invention relates to a method for producing an extruded styrenic resin foam including mixing and melting a styrenic resin mixture, a blowing agent, and a flame retardant to make a foamable molten resin composition, and extruding and foaming the foamable molten resin composition to make a foam having an apparent density of 20 to 60 kg/m$^3$ and a thickness of 10 to 150 mm, wherein the styrenic resin mixture is composed of a resin (A) selected from the following (1) and (2), and a styrenic resin (B), and the content of the (meth) acrylic ester component in the styrenic resin mixture is 4 to 45% by weight:

(1) styrene-(meth)acrylic ester copolymer; and
(2) styrene-(meth)acrylic ester copolymer and polymethyl methacrylate.

In the production method of the present invention, the styrenic resin mixture preferably contains the (meth)acrylic ester component at a ratio of 10 to 30% by weight with reference to the styrenic resin mixture.

The content of the (meth)acrylic ester component in the styrenic resin mixture is preferably 12 to 25% by weight with reference to the styrenic resin mixture.

The styrenic resin mixture is preferably a mixture composed of 10 to 80% by weight of the resin (A) and 20 to 90% by weight of the styrenic resin (B), wherein the total of (A) and (B) is 100% by weight.

The styrenic resin mixture is more preferably a mixture composed of 10 to 60% by weight of the resin (A) and 40 to 90% by weight of the styrenic resin (B), wherein the total of (A) and (B) is 100% by weight.

The content of the (meth)acrylic ester component in the resin (A) is preferably 25 to 80% by weight, and more preferably 40 to 75% by weight.

Preferably, the resin (A) consists of a resin (A1) is composed of a polymethyl methacrylate and/or a styrene-(meth) acrylic ester copolymer containing a (meth)acrylic ester component at a ratio of 40% by weight or more, and a resin (A2) is composed of a styrene-(meth)acrylic ester copolymer containing a (meth)acrylic ester component at a ratio of 5% by weight or more and less than 40% by weight.

More preferably, the resin (A) consists of a resin (A1) is composed of a styrene-(meth)acrylic ester copolymer containing a (meth)acrylic ester component at a ratio of 40 to 75% by weight, and a resin (A2) is composed of a styrene-(meth)acrylic ester copolymer containing a (meth)acrylic ester component at a ratio of 5 to 40% by weight.

Even more preferably, the resin (A) consists of a resin (A1) is composed of a styrene-(meth)acrylic ester copolymer containing a (meth)acrylic ester component at a ratio of 40 to 75% by weight, and a resin (A1) is composed of a styrene-(meth)acrylic ester copolymer containing a (meth)acrylic ester component at a ratio of 15 to 25% by weight.

The mixing ratio between the resin (A1) and the resin (A2) is preferably 90:10 to 50:50, and more preferably 70:30 to 60:40 in terms of weight ratio.

The styrene-(meth)acrylic ester copolymer is preferably a styrene-methyl methacrylate copolymer or a styrene-methyl acrylate copolymer, and more preferably a styrene-methyl methacrylate copolymer.

The blowing agent is preferably at least one selected from aliphatic hydrocarbons having 3 to 5 carbon atoms, alicyclic hydrocarbons having 3 to 6 carbon atoms, aliphatic alcohols having 1 to 4 carbon atoms, dialkyl ethers having an alkyl chain containing 1 to 3 carbon atoms, alkyl chlorides having 1 to 3 carbon atoms, carbon dioxide, and water.

The present invention relates to an extruded styrenic resin foam having a thickness of 10 to 150 mm, an apparent density of 20 to 60 kg/m$^3$, wherein the base resin composing the extruded styrenic resin foam is a styrenic resin mixture composed of a mixture of the resin (A) selected from the following (1) and (2), and the styrenic resin (B), and the content of the (meth)acrylic ester component in the styrenic resin mixture is 4 to 45% by weight:

(1) styrene-(meth)acrylic ester copolymer; and
(2) styrene-(meth)acrylic ester copolymer and polymethyl methacrylate.

The content of the (meth)acrylic ester component in the styrenic resin mixture is more preferably 10 to 30% by weight.

The content of the (meth)acrylic ester component in the styrenic resin mixture is more preferably 12 to 25% by weight.

In the section of the cell membrane region of the extruded styrenic resin foam, the resin (A) is preferably dispersed in the styrenic resin (B) matrix in layers.

In the section of the cell membrane region, the average number of layers of the resin (A) having a length of 0.01 to 0.3

μm in the thickness direction of the cell membrane region is preferably three or more in the thickness direction of the cell membrane region.

In the section of the cell membrane region, the abundance of the resin (A) having a length of 0.01 to 0.3 μm in the thickness direction of the cell membrane region is preferably 90% or more in terms of number.

Preferably, the resin (A) consists of a resin (A1) is composed of polymethyl methacrylate and/or a styrene-(meth)acrylic ester copolymer containing a (meth)acrylic ester component at a ratio of 40% by weight or more, and a resin (A2) is composed of a styrene-(meth)acrylic ester copolymer containing a (meth)acrylic ester component at a ratio of 5% by weight or more and less than 40% by weight.

More preferably, the resin (A) consists of a resin (A1) is composed of the styrene-(meth)acrylic ester copolymer containing a (meth)acrylic ester component at a ratio of 40 to 75% by weight, and a resin (A2) is composed of a styrene-(meth)acrylic ester copolymer containing a (meth)acrylic ester component at a ratio of 5% by weight or more and less than 40% by weight.

Even more preferably, the resin (A) consists of a resin (A1) is composed of a styrene-(meth)acrylic ester copolymer containing a (meth)acrylic ester component at a ratio of 40 to 75% by weight, and a resin (A2) is composed of a styrene-(meth)acrylic ester copolymer containing a (meth)acrylic ester component at a ratio of 15 to 25% by weight.

The weight ratio between the resin (A1) and the resin (A2) is preferably 50:50 to 90:10, and the content of the resin (A2) in the styrenic resin mixture is preferably 5 to 20% by weight.

The styrene-(meth)acrylic ester copolymer is preferably a styrene-methyl methacrylate copolymer.

In the extruded foam of the present invention, the relationship between the apparent density of the extruded styrene resin foam and the content of the hydrocarbon having 3 to 5 carbon atoms in 1 kg of the extruded styrene resin foam preferably satisfies the following formula (1):

$$\rho \cdot \alpha \leq 30 \ [mol/m^3] \quad (1)$$

Wherein $\rho$ is the apparent density [$kg/m^3$] of the extruded styrenic resin foam, and $\alpha$ is the content [mol/kg] of the hydrocarbon having 3 to 5 carbon atoms in 1 kg of the extruded styrenic resin foam.

In the present invention, an extruded styrenic resin foam which provides good foamability, a low thermal conductivity and flame retardant, and keeps excellent heat insulation performance over a long period of time is obtained through the steps of making a styrenic resin mixture containing 4 to 45% by weight of a (meth)acrylic ester component by mixing the styrenic resin (B) with the resin (A) composed of a styrene-(meth)acrylic ester copolymer, or by mixing the styrenic resin (B) with the resin (A) composed of styrene-(meth)acrylic ester and polymethyl methacrylate, adding a flame retardant to the mixture, and then extruding and foaming the mixture using a blowing agent such as a saturated hydrocarbon.

The extruded styrenic resin foam of the present invention has flame retardancy and keeps excellent heat insulating properties, so that is useful as a building insulating material.

BRIEF DESCRIPTION OF THE DRAWINGS

The drawings are transmission electron micrographs showing the sections of the cell membrane of the extruded styrenic resin foam obtained by the present invention.

DESCRIPTION OF THE PREFERRED EMBODIMENTS

Figure 1:
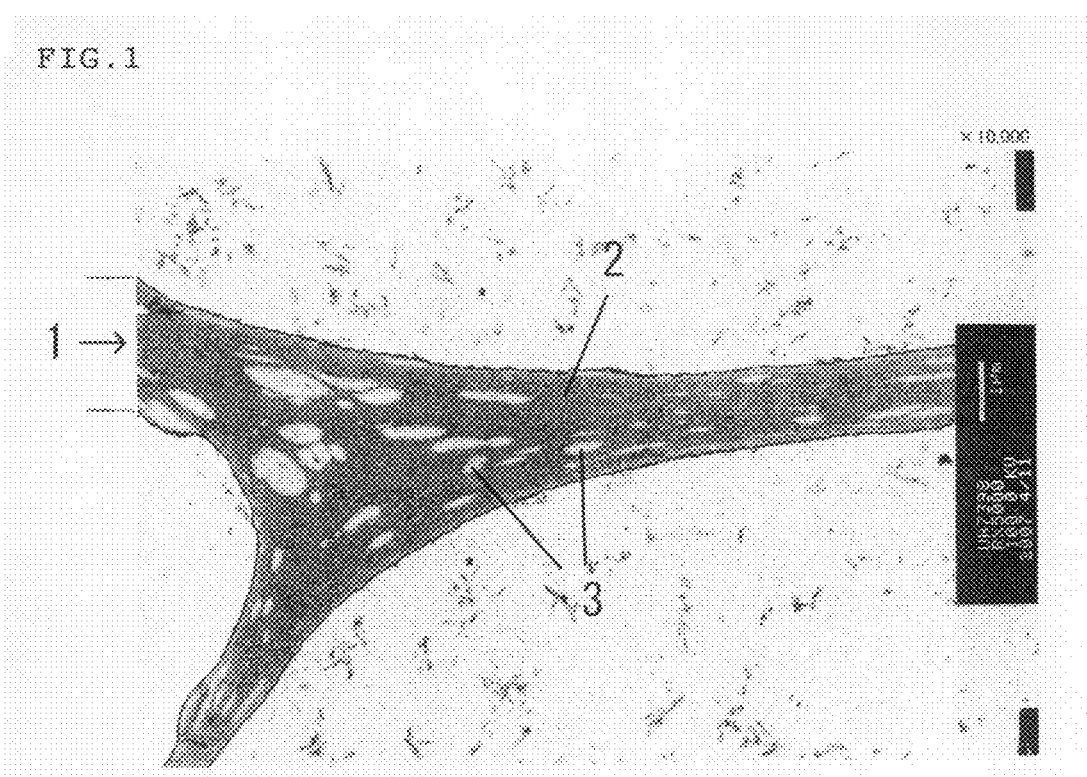
FIG. 1 is a transmission electron micrograph (magnification: 10,000) showing the section of the cell membranes of the foam obtained in Example 26.

The base resin used for the production of the extruded styrenic resin foam of the present invention is a styrenic resin mixture composed of a styrenic resin (B) and a styrene-(meth)acrylic ester copolymer, or a styrenic resin mixture composed of the styrenic resin (B) and a styrene-(meth)acrylic ester copolymer and polymethyl methacrylate (hereinafter the styrene-(meth)acrylic ester copolymer, or the combination of the styrene-(meth)acrylic ester copolymer and polymethyl methacrylate is referred to as resin (A). More specifically, the styrenic resin mixture in the present invention is composed of the resin (A) and the styrenic resin (B), and the styrenic resin mixture contains a (meth)acrylic ester component at a ratio of 4 to 45% by weight. In the present description, acrylic acid and methacrylic acid are generically referred to as (meth) acrylic acid. The extruded styrenic resin foam may be simply referred to as styrenic resin foam, extruded foam or foam.

In the present invention, it is important to adjust the mixing ratio between the resin (A) and the styrenic resin (B) in consideration of the content of the (meth)acrylic ester component in the resin (A) such that the styrenic resin mixture contains a (meth)acrylic ester component at a ratio of 4 to 45% by weight, preferably 5 to 40% by weight, more preferably 8 to 38% by weight, even more preferably 10 to 35% by weight, and particularly preferably 12 to 25% by weight.

If the content of the (meth)acrylic ester component in the styrenic resin mixture is too low, the resin insufficiently decreases thermal conductivity of the foam. On the other hand, if the content of the (meth)acrylic ester component is too high, the foam provides a sufficient thermal conductivity, but provides poor flame retardancy, which results in the failure to meet the flame retardancy specifications required for building materials. Flame retardancy varies depending on the type and amount of the flame retardant used for the production, the density of the extruded foam, and the residual amount of the blowing agent in the foam.

The styrene-(meth)acrylic ester copolymer in the present invention is a copolymer of styrene and a lower alkyl (meth)acrylate, and specific examples thereof include a styrene-methyl acrylate copolymer, a styrene-ethyl acrylate copolymer, a styrene-propyl acrylate copolymer, a styrene-methyl methacrylate copolymer, a styrene-ethyl methacrylate copolymer, and a styrene-propyl methacrylate copolymer. These styrene-(meth)acrylic ester copolymers may be used alone or in combination of two or more of them.

The styrene-(meth)acrylic ester copolymer in the present invention contains 5 to 95% by weight of a (meth)acrylic ester component in the copolymer, and the content of the (meth) acrylic ester component is preferably 10 to 90% by weight, more preferably 25 to 80% by weight, and even more preferably 40 to 75% by weight.

In order to improve processability and other properties, the polymethyl methacrylate may contain a monomer copolymerizable with methyl methacrylate.

The styrene-(meth)acrylic ester copolymer is preferably a styrene-methyl acrylate copolymer or a styrene-methyl methacrylate copolymer which remarkably achieves the intended effect, and in particular, a styrene-methyl methacrylate copolymer is more preferable.

The content of the (meth)acrylic ester component in the resin (A), the content of the (meth)acrylic ester component in the styrene-(meth)acrylic ester copolymer, and the content of the (meth)acrylic ester component in the styrenic resin mixture may be determined by a known method such as pyrolysis gas chromatography.

In the present invention, the styrenic resin (B) is a styrene homopolymer or a copolymer of styrene and a monomer copolymerizable with styrene except a styrene-(meth)acrylic ester copolymer. Examples of the copolymer include a styrene-acrylic acid copolymer, a styrene-methacrylic acid copolymer, a styrene-maleic anhydride copolymer, a styrene-polyphenylene ether copolymer, a mixture of polystyrene and polyphenylene ether, a styrene-acrylonitrile copolymer, an acrylonitrile-styrene-butadiene copolymer, a styrene-butadiene copolymer, a styrene-methylstyrene copolymer, a styrene-dimethylstyrene copolymer, a styrene-ethylstyrene copolymer, a styrene-diethylstyrene copolymer, and high impact polystyrene (HIPS). The content of the styrene component in the styrene copolymer is preferably 50% by weight or more, and more preferably 80% by weight or more. These styrenic resins (B) may be used alone or in combination of two or more of them.

Among these styrenic resins, preferred are a styrene homopolymer, a styrene-acrylic acid copolymer, a styrene-methacrylic acid copolymer, a styrene-maleic anhydride copolymer, a styrene-acrylonitrile copolymer, and a styrene-methylstyrene copolymer, and more preferred are a styrene homopolymer, and a styrene-acrylic acid copolymer, and even more preferred is a styrene homopolymer.

In order to improve compatibility between the styrenic resin (B) and the resin (A), the styrenic resin (B) may be copolymerized with a small amount of a (meth)acrylic ester component without departing from the scopes of the present invention.

In the present invention, the extruded foam contains a styrenic resin mixture composed of the styrenic resin (B) and the resin (A) as the base resin, and the use of the styrenic resin mixture containing a specific amount of the (meth)acrylic ester component as the essential component allows excellent heat insulation performance for providing a low thermal conductivity and keeping heat insulating properties over a long period of time.

In order to investigate the performance, polystyrene as the styrenic resin (B), and a styrene-methyl methacrylate copolymer as the resin (A) were examined in their thermal conductivity, refractive index, and other properties.

In the unfoamed state, the thermal conductivity of a styrene-methyl methacrylate copolymer was higher than that of polystyrene, so that the thermal conductivity of a mixture of polystyrene and a styrene-methyl methacrylate copolymer was higher than that of polystyrene.

In the foamed state, the thermal conductivity of a styrenic resin foam composed of polystyrene and a styrene-methyl methacrylate copolymer was lower than that of a polystyrene foam, and the thermal conductivity of the styrenic resin foam decreased as the increase of the content of the methyl methacrylate component.

The reason is unknown, but is likely due to that the absorption bands of methyl methacrylate component are added to the absorption bands of polystyrene in the infrared region, so that the absorption bands in the infrared region increases and the mixed resin absorbs more infrared rays. Generally, in an unfoamed solid resin, heat spreads through the solid by thermal conduction. Therefore, the thermal conductivity of an unfoamed resin is determined by the thermal conductivity intrinsic to the resin. In a foam, heat spreads through the foam by thermal conduction through the resin, and thermal conduction through the gas contained in the cells in the foam (residual blowing agent and atmosphere component) and their convection. In addition, the cell membrane of the foam is composed of multiple layers, so that heat spreads by the radiation of infrared rays between the layers. The improvement in heat insulating properties of a styrenic resin foam composed of a mixed resin containing polystyrene and a styrene-methyl methacrylate copolymer is likely due to the decrease of radiant heat transmission.

The same goes for styrene-(meth)acrylic ester copolymers other than the styrene-methyl methacrylate copolymer.

It was also confirmed that the thermal conductivity remarkably decreases when the styrenic resin is composed of a styrene-methyl methacrylate copolymer containing a methyl methacrylate component at a high ratio and polymethyl methacrylate. In a styrenic resin foam composed of a styrenic resin mixture of polystyrene and a styrene-methyl methacrylate copolymer containing a methyl methacrylate component at a ratio of 60% by weight, the thermal conductivity was specifically minimized when the content of the methyl methacrylate component in the styrenic resin mixture was about 40% by weight. The minimum point appeared when the content of the methyl methacrylate component in the mixed resin was about 30 to 50% by weight, and the range having the minimum point varied depending on the content of the methyl methacrylate component in the styrene-methyl methacrylate copolymer to be mixed. This is likely due to the difference in the compatibility and refractive index of polystyrene and the styrene-methyl methacrylate copolymer.

Presumably, when polystyrene is mixed with a styrene-methyl methacrylate copolymer and polymethyl methacrylate, the mixture is clouded because they have different refractive indexes (see Table (1)) and are not completely miscible. The cloud diffuses infrared rays and decreases radiant heat transmission, whereby the thermal conductivity is decreased and the heat insulating properties of the foam is improved.

When the styrene-methyl methacrylate copolymer contains a methyl methacrylate component at a high ratio, difference in the refractive index between polystyrene and the copolymer is larger than that between polystyrene and a copolymer containing a methyl methacrylate component at a low ratio (see Table (1)), so that the mixture of polystyrene and the copolymer is more clouded. As a result of this, the thermal conductivity of the foam is further decreased by the improvement of the blocking effect against radiant heat transmission. A styrene-methyl methacrylate copolymer contains styrene as a copolymerization component, so that its compatibility with polystyrene is not so bad that it will not significantly affect the foaming properties. Therefore, the resultant foam is foamed at a high level and contains closed cells at a high ratio.

TABLE 1

| Resin | PS | MS | | | | | PMMA |
|---|---|---|---|---|---|---|---|
| M component content (% by weight) | 0 | 20 | 30 | 50 | 60 | 70 | 100 |
| Refractive index | 1.59 | 1.57 | 1.56 | 1.54 | 1.53 | 1.52 | 1.49 |

(PS: polystyrene, MS: styrene-methyl methacrylate copolymer, PMMA: polymethyl methacrylate, M component: methyl methacrylate component)

The reason that the styrenic resin foam produced by the method of the present invention exhibits excellent heat insulating properties is likely due to that the styrene-(meth)acrylic ester copolymer in the styrenic resin mixture has a certain level of gas barrier properties. In the immediately after the production of the foam, its gas barrier properties delay to a degree the dissipation of the residual blowing agent from the foam into the atmosphere, and the inflow of the atmospheric component into the cells of the foam. The properties are synergized by the blocking effect against radiant heat transmission to further decrease the thermal conductivity of the foam.

On the other hand, after a long period of time from the production of the foam, the atmospheric component flows in the foam because the gas permeation rate of atmospheric component (i.e. air) against the resin component of the foam is high, and the partial pressure of the atmospheric component in the cells becomes the same value regardless of the presence or absence of the styrene-(meth)acrylic ester copolymer. However, the dissipation of the blowing agent from the foam is slightly inhibited, which increases the concentration of the residual blowing agent in the cells. This is synergized by the blocking effect against radiant heat transmission to achieve a low thermal conductivity.

In the present invention, the styrenic resin mixture is preferably composed 10 to 80% by weight of the resin (A) and 20 to 90% by weight of the styrenic resin (B) ((A)+(B)=100% by weight), more preferably 10 to 70% by weight of (A) and 30 to 90% by weight of (B) ((A)+(B)=100% by weight), and even more preferably 10 to 60% by weight of (A) and 40 to 90% by weight of (B) ((A)+(B)=100% by weight). When (A) and/or (B) is composed of two or more kinds thereof, their total is regarded as 100% by weight.

In the present invention, considering the above results, if the content of the (meth)acrylic ester component in the resin mixture is too high, the flame retardancy is affected. Therefore, the resin (A) must be mixed with the styrenic resin (B) such that the content of the (meth)acrylic ester component in the resin mixture falls within the above-described specific range, more specifically 4 to 45% by weight considering the content of the (meth)acrylic ester component in the styrene-(meth)acrylic ester copolymer.

In the present invention, the content of the (meth)acrylic ester component in the styrene-(meth)acrylic ester copolymer is, as described above, 5 to 95% by weight, preferably 10 to 90% by weight, more preferably 25 to 80% by weight, even more preferably 30 to 75% by weight, particularly preferably 40 to 75% by weight, and most preferably 45 to 75% by weight. When the content of the (meth)acrylic ester component in the styrene-(meth)acrylic ester copolymer is within the range, as described above, the styrenic resin mixture containing the copolymer is more clouded without significantly inhibiting the foaming properties. Therefore, the resultant foam has more effectively decreased thermal conductivity while keeping foaming properties. In addition, the heat decomposition temperature of the copolymer is not significantly lower than that of polystyrene, which facilitates to produce the foam having intended flame retardancy.

In the present invention, two or more of the styrene-(meth) acrylic ester copolymer containing (meth)acrylic ester components at different ratios may be used together as the resin (A). When two or more of the styrene-(meth)acrylic ester copolymer are used together, the average content of the (meth)acrylic ester component in respective styrene-(meth) acrylic ester copolymers is regarded as the content of the (meth)acrylic ester component in the resin (A).

As described above, the extruded styrenic resin foam composed of a mixture of the styrenic resin (B) and the resin (A) diffuses or absorbs infrared rays, reduces heat transfer caused by radiation, and exhibits low thermal conductivity. In particular, the styrenic resin (B) and the resin (A) composing the extruded styrenic resin foam of the present invention form a sea-island structure in the section of the cell membrane region of the foam, and the resin (A) is dispersed in the styrenic resin (B) matrix in layers. Accordingly, the styrenic resin mixture has a higher ability to diffuse infrared rays, and thus more efficiently reduces radiant heat transmission than other forms wherein the resin (A) is not dispersed in layers but scattered in granular form, or the styrenic resin (B) is dispersed in the resin (A).

In the present invention, "cell membrane region" does not include the region where three or more cell membranes are associated. The region excluding the associated region usually refers to, although it varies depending on the degree of stretch of the cell membrane, the region having the smallest thickness or a thickness up to 1.3 times greater than the smallest thickness. Radiant heat transmission occurs mainly between the cell membranes region, so that state of dispersion of the resin (A) in the cell membrane region is important for the effective reduction of radiant heat transmission.

Figure 4:
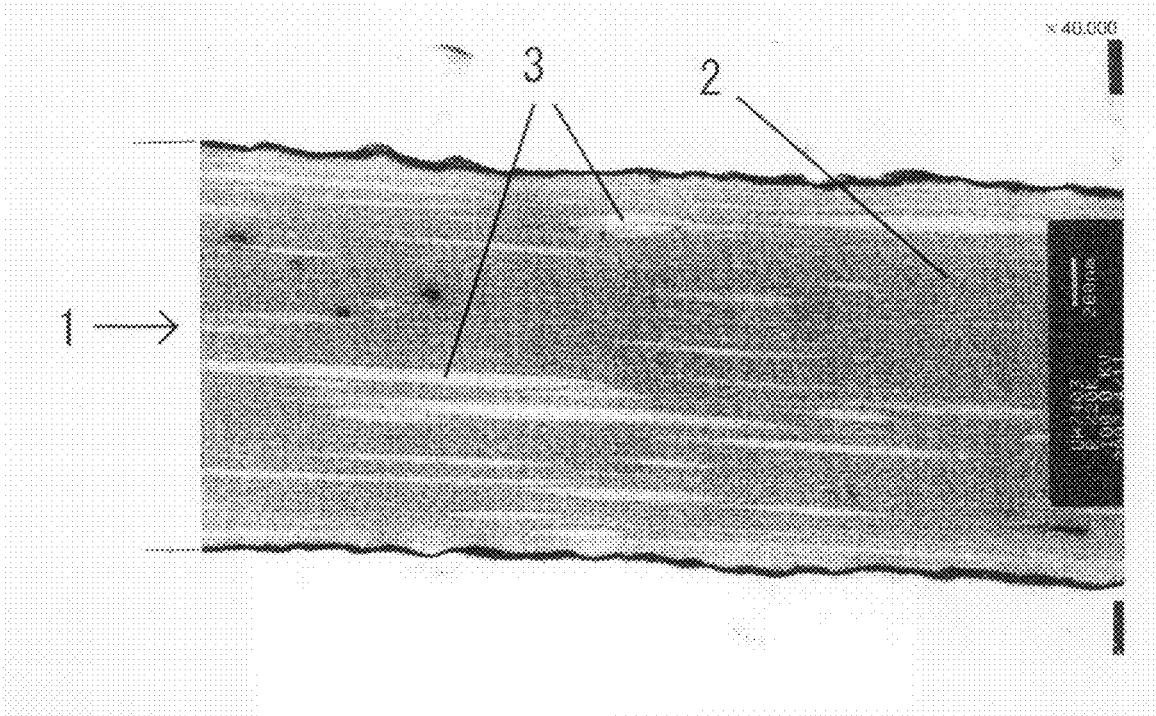
FIG. 4 is a transmission electron micrograph (magnification: 40,000) showing the section of the cell membranes of the foam obtained in Example 25.

In the present invention, "dispersed in layers" means that, in the section of the cell membrane, for example, as shown in FIG. 4, most part of the resin (A) is finely dispersed in the styrenic resin (B) matrix stretched in a direction orthogonal to the thickness direction of the cell membrane region (hereinafter referred to as "direction along the cell membranes"), wherein a plurality of layers of the resin (A) is stacked in the thickness direction of the cell membranes.

The thermal conductivity of the foam decreases as the number of layers of the resin (A) increases. From that viewpoint, specifically, the average number of layers of the resin (A) is preferably 3 or more, more preferably 5 or more, even more preferably 7 or more, particularly preferably 10 or more, and most preferably 20 or more in the thickness direction of the cell membranes. If the layers of the resin (A) are too many to accurately count, the number of layers is regarded as 20 or more where appropriate.

The number of layers of the resin (A) in the thickness direction of the cell membrane region may be increased by increasing the content of the resin (A) without reversing the sea-island structure. However, in order to produce the foam having remarkably low thermal conductivity and excellent mechanical strength, the resin (A) must be dispersed in layers. More specifically, if the resin (A) is scattered in almost granular form in the section of the cell membrane region, the resultant foam will not have remarkably low thermal conductivity or excellent mechanical strength.

The thermal conductivity of the foam is more effectively reduced as the aspect ratio (b/a) increases, wherein a and b are the lengths of the resin (A) component in the thickness direction of the cell membrane region and along the cell membranes, respectively. Specifically, the average of the aspect ratio is preferably 2 or more, more preferably 3 or more, and particularly preferably 5 or more. The thermal conductivity decreases as the aspect ratio increases. From that viewpoint, there is no upper limit for the aspect ratio. However, the upper limit of the aspect ratio which can be achieved by the stretch of cell membranes during foaming is about 100.

In order to effectively reduce the thermal conductivity of the foam, the resin (A) must be finely dispersed in styrenic resin (B) matrix in layers. Specifically, the thickness of the resin (A) in the thickness direction of the cell membrane region is preferably 0.3 µm or less. However, if the resin (A) is too finely dispersed, the effect in reflecting or absorbing infrared rays is decreased. Therefore, in order to effectively reduce the thermal conductivity of the foam, the length (a) of the resin (A) must be at least 0.01 µm.

The resin (A) component in the section of the cell membrane region of the foam preferably occupies the most part of the resin (A) component contained in the section of the cell membrane region of the foam. Specifically, when the abundance of the resin (A), which is finely dispersed in layers within a certain range, is 90% or more in terms of number, the thermal conductivity is further decreased, and the foam has excellent mechanical strength like a usual extruded polystyrene foam.

In the present invention, the sea-island structure of the section of the cell membrane region of the foam is stained as described below, and observed using a transmission electron microscope.

In the first place, the extruded foam is cut into a test piece of an appropriate size, and the test piece is embedded in an epoxy resin. After the embedding, a plane vertical to the thickness direction is cut using a glass knife or the like, and an ultrathin slice having a thickness of about 0.1 µm is cut from the section using a diamond knife or the like. The slice (sample) is mounted on a Cu mesh, and placed in a petri dish together with several milliliters of a 2% $OsO_4$ aqueous solution. The petri dish is sealed at room temperature, the sample is exposed to and stained by the vapor of $OsO_4$ for 30 minutes. Subsequently, the sample is placed in a petri dish together with a solution prepared by mixing several milliliters of a NaClO aqueous solution with a spatulaful of $RuCl_3$ crystals just before the use. The petri dish is sealed at room temperature, the sample is exposed to and stained with the vapor of $RuO_4$ for 30 minutes. The micrograph of the cell membranes in the stained ultrathin slice is taken using a transmission electron microscope. In the electron micrograph, the resin (A) components (island components) containing the methyl methacrylate component look light white, and the styrenic resin (B) components (sea components) look dense black. The transmission electron microscope may be, for example, "JEM-1010" manufactured by JEOL Ltd.

[Average Number of Layers of Resin (A)]

Arbitrary 20 line segments orthogonal to the cell membrane region are drawn on the image obtained above, and the number of layers of resin (A)(island components) intersecting respective line segments and having a length of 0.01 to 0.3 µm in the thickness direction of the cell membrane region, and an aspect ratio of 2 or more is counted. These values are arithmetically averaged to determine the average number of layers of resin (A) contained in one area in the section of the cell membrane region. The average number of layers is measured in 10 areas in the section of the cell membrane region in another visual field, and the average numbers of layers determined in respective cell membrane regions are arithmetically averaged to determine the average number of layers of the resin (A) having a length of 0.01 to 0.3 µm in the thickness direction of the cell membrane region contained in the section of the cell membrane region.

[Abundance of Resin (A) in Terms of Number]

In the same manner as the above-described method, the average number of layers of the resin (A) (island components) having a length of 0.01 µm or more in the thickness direction of the cell membrane region contained in the section of the cell membrane region is determined. The average number of layers of the resin (A) is divided by the average number of the resin (A) in the thickness direction of the cell membrane region contained in the section of the cell membrane region, and the percentage of the quotient is used as the abundance of the resin (A) having a length of 0.01 to 0.3 µm in the thickness direction of the cell membrane region.

The styrenic resin mixture, which is composed of the resin (A) and the styrenic resin (B), composing the foam of the present invention is strictly a incompatible system. The mechanical strength of the mixture composed of immiscible resins may be significantly lower than the mechanical strength of the respective resins depending on the mixed condition. In order to improve the mechanical strength, the resins must be finely dispersed. However, in the foam, the mechanical strength of the foam may not be sufficiently improved just by finely dispersing the resin (A) in the styrenic resin mixture. A styrenic resin foam acquires excellent mechanical strength through stretch of cell membranes during foaming.

Accordingly, even if the resin (A) is finely dispersed in the styrenic resin (B), the resultant foam has poor mechanical strength unless the resin (A) is not dispersed in layers in the cell membranes, more specifically, the resin (A) is not stretched. Therefore, from the viewpoint of mechanical strength, it is important that the resin (A) is dispersed finely in layers in the styrenic resin (B) matrix.

As described above, the thermal conductivity of the foam can be effectively decreased by mixing the styrenic resin (B) with the resin (A) containing a (meth)acrylic ester component at a high ratio. In order to disperse the resin (A) in layers in the continuous phase of the styrenic resin (B), the resin (A) must be oriented along the cell membranes stretched during extrusion and foaming. However, it is difficult to disperse the resin (A) just by mixing the styrenic resin (B) with the resin (A) containing a (meth)acrylic component at a high ratio.

In order to disperse the resin (A), which contains a (meth) acrylic ester component at a high ratio, in layers in the styrenic resin (B) matrix, the compatibility volume ratio, and viscosity balance between the styrenic resin (B) and the resin (A) must be adjusted before mixing.

For example, in order to improve the compatibility between the styrenic resin (B) and the resin (A) containing a (meth)acrylic ester component at a high ratio (hereinafter referred to as resin (A1)) thereby uniformly dispersing the resin (A1) in layers in the continuous phase of the styrenic resin (B), as a way of dispersing resin (A1) uniformly, a resin for accelerating the compatibility between them may be added, or the compatibility of the styrenic resin (B) with the resin (A1) may be improved. Specifically, in the former case, the resin (A1) may be combined with another resin (A) containing a (meth)acrylic ester component at a low ratio (hereinafter referred to as resin (A2)). In the latter case, a styrenic resin prepared by copolymerizing styrene with a monomer having a molecular structure close to a (meth)acrylic ester component, such as a carbonyl group, may be used as the styrenic resin (B).

As described above, when the resin (A) consists of the resin (A1) and the resin (A2), from the viewpoint of imparting insulating properties, in consideration of the difference of the refractive index between the styrenic resin (B) and resin (A), the content of the (meth)acrylic ester component in the resin (A) is preferably higher. From that viewpoint, the resin (A1) is preferably polymethyl methacrylate and/or a styrene-(meth)acrylic ester copolymer containing a methyl methacrylate component at a ratio of 40% by weight or more, more preferably polymethyl methacrylate and/or a styrene-(meth) acrylic ester copolymer containing a (meth)acrylic ester component at a ratio of 45% by weight or more, and even more preferably polymethyl methacrylate and/or a styrene-methyl methacrylate copolymer containing a (meth)acrylic ester component at a ratio of 50% by weight or more. When the content of the (meth)acrylic ester component in the styrenic resin mixture is adjusted to predetermined amount by mixing the resin A and the styrenic resin (B), if the content of the (meth)acrylic ester component in the resin (A1) is high, the absolute amount of the resin (A) island components dispersed in the styrenic resin (B) matrix is decreased. Therefore, the effect in reducing the radiant heat transmission tends to decrease to a degree. From that viewpoint, the resin (A1) is more preferably a styrene-(meth)acrylic ester copolymer containing a (meth)acrylic ester component at a ratio of 40 to 80% by weight, and particularly preferably a styrene-(meth) acrylic ester copolymer containing a (meth)acrylic ester component at a ratio of 50 to 70% by weight.

In order to disperse the resin (A1) in layers in the styrenic resin (B), the content of the (meth)acrylic ester component in the resin (A2) is preferably less than 40% by weight, more preferably 35% by weight or less, even more preferably 30% by weight or less, and particularly preferably 15 to 25% by weight.

In order to more effectively disperse the resin (A) in layers in the styrenic resin (B), the weight ratio between the resin (A1) and the resin (A2) is preferably 50:50 to 90:10, and more preferably 50:50 to 80:20. When the weight ratio between the resin (A1) and the resin (A2) is within the above-described range, the content of the resin (A2) in the styrenic resin mixture is more preferably 5 to 20% by weight, and particularly preferably 8 to 15% by weight.

And also, in order to more effectively disperse the resin (A) in the resin (B) matrix in layers, the melt viscosity of the resin (A) and styrenic resin (B) is preferably closer, and the volume ratio (weight ratio) between the styrenic resin (B) and resin (A) is preferably closer.

The styrenic resin mixture of the present invention may contain other polymer without impairing the object and effect of the present invention. Examples of the other polymer include polyethylenic resins, polypropylenic resins, a styrene-butadiene-styrene block copolymer and hydrogenated derivatives thereof, a styrene-isoprene-styrene block copolymer, and hydrogenated derivatives thereof, a styrene-ethylene copolymer, and an acrylonitrile-alkyl acrylate-butadiene copolymer.

The content of the other polymer is preferably 30 parts by weight or less, more preferably 10 parts by weight or less, and particularly preferably 5 parts by weight or less with reference to 100 parts by weight of the styrenic resin mixture.

In the production method of the present invention, a known blowing agent having an ozone depleting potential of 0 (zero) may be used. The blowing agent is preferably one having relatively low gas permeability through the styrenic resin mixture of the present invention to keep high heat insulating properties over a long period of time. Examples of the blowing agent having relatively low gas permeability include aliphatic hydrocarbons having 3 to 5 carbon atoms such as propane, n-butane, isobutane, n-pentane, isopentane, and neopentane, and alicyclic hydrocarbons having 3 to 6 carbon atoms such as cyclobutane, cyclopentane and cyclohexane. Among them, preferred are n-butane, isobutane, n-pentane, isopentane, and cyclopentane because they have low gas permeability and excellent foaming properties, and more preferred are n-butane and isobutane and particularly preferred is isobutane because they provide excellent handleability besides the gas permeability and foaming properties. These blowing agents may be alone or in combination of two or more of them.

In view of the flame retardancy of the resultant foam, the amount of the hydrocarbon is limited. Therefore, when the foam having a low apparent density is to be produced, it is preferable that the hydrocarbon be used together with another blowing agent having higher gas permeability through the styrenic resin mixture of the present invention than the hydrocarbon. Through the use of the mixed blowing agent, the content of the hydrocarbon can be reduced, and another blowing agent except the hydrocarbon is dissipated from the foam immediately after foaming. Therefore, intended flame retardancy is achieved with the addition of a flame retardant.

Examples of the blowing agent having high gas permeability include alkyl chlorides, alcohols, ethers, ketones, carbon dioxide, and water. Among these blowing agents, preferred are alkyl chlorides having 1 to 3 carbon atoms, aliphatic alcohols having 1 to 4 carbon atoms, ethers having an alkyl chain containing 1 to 3 carbon atoms, carbon dioxide, and water. Specific examples of alkyl chlorides having 1 to 3 carbon atoms include methyl chloride and ethyl chloride. Specific examples of aliphatic alcohols having 1 to 4 carbon atoms include methanol, ethanol, propyl alcohol, isopropyl alcohol, butyl alcohol, sec-butyl alcohol, tert-butyl alcohol, aryl alcohol, crotyl alcohol, and propargyl alcohol. Examples of the ether having an alkyl chain containing 1 to 3 carbon atoms include dimethyl ether, ethyl methyl ether, diethyl ether, and methylene dimethyl ether. Among these blowing agents, particularly preferred are methyl chloride, dimethyl ether, carbon dioxide, and water because they have high gas permeability and provide excellent handleability. These blowing agents may be used alone or in combination of two or more of them.

The blowing agent may further contain a HFC such as 1,1,1,2-tetrafluoroethane or 1,1-difluoroethane without impairing the object of the present invention.

The usage of the blowing agent is appropriately selected according to the intended expansion ratio. In order to produce the foam having an apparent density of 20 to 60 $kg/cm^3$, usually 0.5 to 3 mol, preferably 0.6 to 2.5 mol of the mixed blowing agent is added to 1 kg of the styrenic resin mixture.

When the extruded styrenic resin foam obtained by the present invention is used mainly as a building insulating board, the extruded styrenic resin foam is required to has a high level of flame retardancy which meets the flammability specifications for heat insulating boards made of extruded polystyrene foam defined in JIS A9511 (2006) 5.13.1 "Measurement Method A". In addition, the styrenic resin foam obtained by the present invention is required to meet the thermal conductivity specifications defined in JIS A9511 (2006) 4.2. Accordingly, when the hydrocarbon is used as a blowing agent, the additive amount of the hydrocarbon must be determined such that both the specifications of the flame retardancy and thermal conductivity are satisfied. Accordingly, the blowing agent having a relatively high gas permeability is appropriately selected according to the amount of the hydrocarbon thereby achieving the intended apparent density.

A styrenic resin foam having a high level of flame retardancy which meets the flammability specifications for heat insulating boards made of extruded polystyrene foam defined in JIS A9511 (2006) 5.13.1 "Measurement Method A" is obtained through the adjustment of the hydrocarbon content, and the addition of a flame retardant. The flame retardant used herein may be a known flame retardant which has been used for the production of styrenic resin foams.

The flame retardant is preferably a bromine flame retardant. Examples of the bromine flame retardant include tetrabromobisphenol A, tetrabromobisphenol A bis(2,3-dibromopropyl ether), tetrabromobisphenol A bis(2-bromoethyl ether), tetrabromobisphenol A bis(allyl ether), 2,2-bis[4-(2,3-dibromo-2-methylpropoxy)-3,5-dibromophenyl]propane, tetrabromobisphenol S, tetrabromobisphenol S-bis(2,3-dibromopropyl ether), hexabromocyclododecane, tetrabromocyclooctane, tris(2,3-dibromopropyl) isocyanurate, tribromophenol, decabromodiphenyl oxide, tris(tribromoneopentyl) phosphate, brominated bisphenol ether derivatives. These compounds may be used alone or in combination of two or more of them. Among these bromine flame retardants, particularly preferred are hexabromocyclododecane, tetrabromobisphenol A bis(2,3-dibromopropyl ether), 2,2-bis[4-(2,3-dibromo-2-methylpropoxy)-3,5-dibromophenyl]propane, and tris (2,3-dibromopropyl) isocyanurate because they have high heat stability and provide high flame retardancy.

The content of the flame retardant in the extruded foam of the present invention is preferably 1 to 10 parts by weight, more preferably 1.5 to 7 parts by weight, and even more preferably 2 to 5 parts by weight with reference to 100 parts by weight of the styrenic resin mixture to improve the flame retardancy and minimize the deterioration of the foaming properties and mechanical physical properties.

In the present invention, in order to further improve the flame retardancy of the extruded foam, a flame retardant aid may be used together with the bromine flame retardant. Examples of the flame retardant aid include diphenylalkanes and diphenylalkenes such as 2,3-dimethyl-2,3-diphenylbutane, 2,3-diethyl-2,3-diphenylbutane, 3,4-dimethyl-3,4-diphenylhexane, 3,4-diethyl-3,4-diphenylhexane, 2,4-diphenyl-4-methyl-1-pentene, and 2,4-diphenyl-4-ethyl-1-pentene, triphenyl phosphate, cresyl-di-2,6-xylenyl phosphate, antimony trioxide, diantimony pentoxide, ammonium sulfate, zinc stannate, nitrogen-containing cyclic compounds such as cyanuric acid, isocyanuric acid, triallyl isocyanurate, melamine cyanurate, melamine, melam, and melem, inorganic compounds such as silicon compounds, boron oxide, zinc borate, and zinc sulfide, and phosphorus compounds such as red phosphorus compounds, polyammonium phosphate, and phosphazene. These compounds may be used alone or in combination of two or more of them.

The method for mixing the flame retardant and flame retardant aid with the styrenic resin mixture may be a method wherein intended proportions of the flame retardant and flame retardant aid are fed together with the styrenic resin into the raw material feeding unit provided at the upstream of the extruder, and mixed with the styrenic resin mixture in the extruder. Alternatively, the flame retardant and flame retardant aid may be fed to the styrenic resin mixture from the flame retardant feeding unit provided within the extruder.

Examples of the method for feeding the flame retardant and flame retardant aid into an extruder include a method of feeding a dry blend of the flame retardant, flame retardant aid, and styrenic resin mixture into an extruder, a method of feeding a molten blend of the flame retardant, flame retardant aid, and styrenic resin, which has been kneaded with a kneader or the like, into an extruder, a method of feeding a liquid flame retardant, which has been heated and melted, into an extruder, and a method of feeding a master batch containing the flame retardant and flame retardant aid into an extruder. In particular, the method of feeding a master batch containing the flame retardant and flame retardant aid into an extruder is preferred from the viewpoint of dispersibility.

When the styrenic resin foam in the present invention is measured for its flammability on the basis of the flammability specifications for heat insulating boards made of polystyrene foam defined in JIS A9511 (2006) 5.13.1 "Measurement Method A", the flame burn out within 3 seconds leaving no residue, and will not exceed the indicating line of combustion limit. Accordingly, the foam board having such combustion characteristics prevents spread of fire, and offers a high level of safety required of a building insulating board made of extrusion polystyrene foam.

The extruded styrenic resin foam in the present invention has a thickness of 10 to 150 mm. If the thickness is less than 10 mm, the foam has insufficient heat insulating properties to serve as an insulating material. On the other hand, if the thickness is more than 150 mm, handle-ability as an insulating material deteriorates. Accordingly, the thickness is preferably 15 mm to 120 mm.

The extruded styrenic resin foam of the present invention has an apparent density of 20 to 60 k g/cm$^3$. It is very difficult to produce a low density extruded foam having an apparent density of less than 20 kg/cm$^3$. Even if such a low density extruded foam is obtained, it has insufficient mechanical strength to serve as an insulating material. On the other hand, if the apparent density is more than 60 kg/cm$^3$, the thickness of the extruded foam must be improperly increased to achieve sufficient heat insulating properties, which is undesirable from the viewpoint of lightness.

In the method of the present invention, the extruded foam has an apparent density of 20 to 60 kg/cm$^3$, preferably 22 to 55 k g/cm$^3$, and more preferably 22 to 50 kg/cm$^3$ to achieve high heat insulation performance, and to provide high flame retardancy with the addition of a relatively small amount of hexabromocyclododecane or other known flame retardant which has been used for extruded foams of this type.

The cells contained in the extruded foam obtained by the present invention have a diameter of preferably 0.05 to 2 mm, more preferably 0.06 to 1 mm, and even more preferably 0.07 to 0.8 mm along the thickness direction of the extruded foam. When the average cell diameter along the thickness direction is within the range, the extruded foam has excellent mechanical strength, and has higher heat insulating properties.

In the present description, the average cell diameter is measured as follows. The average cell diameter in the thickness direction of the extruded foam ($D_T$: mm) and the average cell diameter in the width direction of the extruded foam ($D_W$: mm) are determined from the vertical section of the extruded foam in the width direction (the vertical section orthogonal to the extrusion direction of the extruded foam), and the average cell diameter ($D_L$: mm) in the longitudinal direction of the extruded foam is determined from the vertical section of the extruded foam in the longitudinal direction (the vertical section halved at the center in the width direction in parallel with the extrusion direction of the extruded foam). The vertical section is magnified with a microscope or the like and displayed on a screen or monitor, and line segments are drawn on the image in the direction to be measured. The number of cells intersecting with the respective line segments is counted, and the length of the respective line segments is divided by the number of cells thereby determining the average cell diameter in the respective directions (wherein the length is not the length of the line segment on the magnified image, but the length of the true line segment in consideration of the magnification of the image).

The method for measuring the average cell diameter is detailed below. In order to measure the average cell diameter ($D_T$: mm) in the thickness direction, line segments across the whole thickness are drawn at the center and both ends of the vertical section in the width direction, and the length of the respective line segments is divided by the number of cells intersecting with the respective line segments thereby determining the average diameter of cells on the respective line segments (i.e. the length of line segments/the number of cells intersecting with the respective line segments). The arithmetic average of the average diameter at the three locations is regarded as the average cell diameter in the thickness direction ($D_T$: mm).

In order to determine the average cell diameter in the width direction ($D_W$: mm), line segments each having a length of 3 mm are drawn along width direction at the center and both ends of the vertical section in the width direction so as to halve the extruded foam in the thickness direction. The length of the respective line segment (3 mm) is divided by (the number of cells intersecting with the respective line segments)−1 thereby determining the average diameter of the cells on the respective line segments (i.e. 3 mm/(the number of cells intersecting with the respective line segments)−1). The arithmetic average of the average diameter at the three locations is regarded as the average cell diameter in the width direction ($D_W$: mm).

In order to determine the average cell diameter in the longitudinal direction ($D_L$: mm), the test piece is cut to obtain a vertical section in the longitudinal direction, and line segments are drawn in the longitudinal direction at the center and both ends of the vertical section in the longitudinal direction so as to halve the extruded foam in the thickness direction. The length of the respective line segment (3 mm) is divided by (the number of cells intersecting with the respective line segments)−1 thereby determining the average diameter of the cells on the respective line segments (i.e. 3 mm/(the number of cells intersecting with the respective line segments)−1). The arithmetic average of the average diameter at the three locations is regarded as the average cell diameter in the longitudinal direction ($D_L$: mm). The average cell diameter ($D_H$: mm) of the extruded foam in the horizontal direction is the arithmetic average of $D_W$ and $D_L$.

The extruded foam obtained by the present invention preferably has a rate of cell deformation of 0.7 to 2.0. The rate of cell deformation refers to a value calculated by dividing $D_T$ by $D_H$ ($D_T/D_H$). As the rate of cell deformation decreases than 1, the cell form approaches flat oval sphere, while the rate increases over 1, the cell form approaches vertically long oval sphere. When the rate of cell deformation is within the range, the resultant extruded foam has excellent mechanical strength such as compression strength, excellent dimensional stability, and high heat insulating properties. From that viewpoint, the rate of cell deformation is preferably 0.8 to 1.5, and more preferably 0.8 to 1.2.

The closed cell ratio of the extruded foam of the present invention is preferably 90% or more, and more preferably 93% or more. As the closed cell ratio is higher, the higher heat insulation performance is maintained. The closed cell ratio is determined according to the procedure C defined in ASTM-D2856-70. The true volume (Vx) of the extruded foam is measured using an air comparison pycnometer (Model 930, manufactured by Toshiba Beckman Co. Ltd.), and the closed cell ratio S (%) is calculated by the formula (1) described below.

Three samples were cut out from three different portions of the extruded foam, and measured individually. The samples were cut out from the extruded foam in a dimension of 25 mm×25 mm×20 mm, and had no molded skins. If the extruded foam is so thin that a sample having a thickness of 20 mm cannot be cut out therefrom, for example, two samples each having a dimension of 25 mm×25 mm×10 mm may be stacked and used for the measurement:

$$S(\%) = (Vx - W/\rho) \times 100/(VA - W/\rho) \quad (1)$$

wherein

Vx: true volume ($cm^3$) of the sample used for the measurement (corresponds to the sum of the volume of the resin composing the sample cut out from the extruded foam and the total volume of the closed cells in the sample);

VA: apparent volume ($cm^3$) of the sample calculated from the outer dimension of the sample used for the measurement;

W: total weight (g) of the sample used for the measurement; and $\rho$: density ($g/cm^3$) of the resin composing the extruded foam.

In the method of the present invention, the styrenic resin mixture may further contain a heat insulation improver to further improve the heat insulating properties. Examples of the heat insulation improver include fine powders of metals, metal oxides, ceramic, carbon black, and graphite, infrared blocking pigments, and hydrotalcite. These improvers may be used alone or in combination of two or of them. If a fine powder of a metal, metal oxide, carbon black, or graphite is added as the heat insulation improver in a heavy amount, the cell diameter excessively decrease, which results in difficulty in molding and deterioration of the flame retardancy and mechanical and physical properties. Therefore, the amount of the heat insulation improver is 0.5 to 5 parts by weight, and preferably 1 to 4 parts by weight with reference to 100 parts by weight of the styrenic resin mixture.

When an extruded styrenic resin foam is produced according to the present invention, the heat insulation improver may be added to the styrenic resin mixture by dry-blending a predetermined amount of the heat insulation improver with the styrenic resin mixture, feeding the blend into an extruder from the feeding unit provided at the upstream of the extruder, and then mixing the blend with the molten styrenic resin mixture. Alternatively, a high concentration of the heat insulation improver is mixed with a styrenic resin to make a master batch, the master batch is fed into an extruder, and molten and mixed together with a styrenic resin mixture containing no heat insulation improver to make a molten styrenic resin mixture. In particular, from the viewpoint of dispersibility, the master batch system is preferred. The master batch is prepared such that the content of the heat insulation improver in the styrenic resin is 10 to 80% by weight, preferably 20 to 70% by weight, and even more preferably 30 to 60% by weight.

The styrenic resin in the present invention may further contain other various additives such as a nucleating agent for adjusting the cell diameter, a pigment, a dye or other coloring agent, a heat stabilizer, and other fillers.

Examples of the nucleating agent include inorganic powder such as talc, kaolin, mica, silica, calcium carbonate, barium sulfate, titanium oxide, aluminum oxide, clay, bentonite, and diatomaceous earth, and known chemical blowing agents such as azodicarbodiamide. Among them, talc is preferred because it facilitates control of the cell diameter without impairing flame retardancy. In particular, preferred is fine talc having a D50 particle diameter of 0.1 to 20 μm, and more preferably 0.5 to 15 μm as measured by the light transmission sedimentation method. The content of the nucleating agent varies depending on the type of the nucleating agent and the intended cell diameter. When talc is used, its content is preferably 8 parts by weight or less (may be 0), more preferably 7 parts by weight or less (may be 0), even more preferably 5 parts by weight or less (may be 0), and particularly preferably 0.01 to 4% by weight with reference to 100 parts by weight of the styrenic resin mixture.

The nucleating agent is also preferably prepared using a master batch of the styrenic resin from the viewpoint of dispersibility. When talc is used as the cell regulator, the master batch of the nucleating agent is prepared such that the talc content in the styrenic resin is preferably 20 to 80% by weight, and more preferably 30 to 70% by weight.

The extruded styrenic resin foam of the present invention is produced as follows: a styrenic resin, a flame retardant, and other additives are molten and mixed together in an extruder to make a melt, the melt is mixed with a predetermined amount of blowing agent injected from a predetermined position of the extruder, and the styrenic resin foamable molten composition containing the blowing agent and the flame retardant is extruded from the die lip at the tip of the extruder under atmospheric pressure, and molded into a predetermined shape (board shape) with a shaping device (guider). The shaping device may be composed of, for example, upper and lower polytetrafluoroethylene plates.

The extruded styrenic resin foam of the present invention is prepared from a styrene-(meth)acrylic ester copolymer, or a styrene-(meth)acrylic ester and polymethyl methacrylate as a component of the styrenic resin mixture, wherein the styrenic resin mixture contains the (meth)acrylic ester component derived from the copolymer, or the copolymer and polymethyl methacrylate within the above-described range.

The upper limit of the blowing agent remaining in the foam of the present invention is preferably 0.9 mol or less (may be 0), more preferably 0.8 mol or less, and even more preferably 0.7 mol or less with reference to 1 kg of the styrenic resin to improve flame retardancy.

The lower limit of the blowing agent remaining in the foam cannot be specified because it varies depending on the demanded level of heat insulating properties. For example, in order to achieve the thermal conductivity of the No. 3 heat insulating board made of extrusion polystyrene foam defined in JIS A9511 (2006), the content of the residual blowing agent is preferably 0.3 mol or more, more preferably 0.4 mol or more, and even more preferably 0.5 mol or more with reference to 1 kg of the styrenic resin.

The residual amount of the blowing agent in the foam was gas measured by gas chromatography. Specifically, a test piece (200 mm×200 mm×25 mm) having no molded skins was cut out from the extruded foam immediately after the production, and the test piece was stored at 23° C. and a humidity of 50%. On the 100th day after the production, a piece was cut out from the test piece with a width of 2.5 cm, and a length to give a sample weight of 1 g, and used as the sample. The sample was placed in a sample bottle containing toluene and the bottle was capped. Then, the bottle was thoroughly stirred thereby dissolving the blowing agent contained in the foam in toluene. The solution was subjected to gas chromatography to determine the residual amount of the blowing agent.

[Conditions for Gas Chromatography]

Column: Manufactured by Shinwa Chemical Industries Ltd.

Carrier: Chromosorb W, 60 to 80 mesh, treated with AW-DMCS

Liquid phase: Silicone DC550 (liquid phase ratio: 20%)

Column dimension: Column length 4.1 m, column inside diameter 3.2 mm

Column material: glass

Column temperature: 40° C.

Injection port temperature: 200° C.

Carrier gas: nitrogen

Carrier gas rate: 50 ml/min.

Detector: FID

Detector temperature: 200° C.

Quantitation: Internal standard method

EXAMPLES

The present invention is illustrated below with reference to the following examples and comparative examples. However, the present invention is not limited to the examples without departing from the scope of the present invention.

[Raw Material]

Table 2 lists the styrenic resin (B), and Tables 3 and 4 list the resin (A) used in Examples and Comparative Examples.

TABLE 2

| Abbreviation | Type | Manufacturer | Product No. | MFR[1] (g/10 minutes) | Melt viscosity[2] (Pa · s) |
|---|---|---|---|---|---|
| PS1 | Styrene homopolymer | PS Japan Corporation | HH32 | 1.6 | 1630 |
| PS2 | Styrene homopolymer | PS Japan Corporation | 679 | 19 | 670 |
| PS3 | Styrene-methacrylic acid copolymer | PS Japan Corporation | G9001 | 1.2 | 1960 |

[1]Melt mass flow rate measured according to Test Method A defined in JIS K7210 (1999). The value was measured at a test temperature of 200° C. under a load of 5 kg.
[2]Measured at 200° C. and a shear rate of 100/s.

TABLE 3

| Abbreviation | Type | Manufacturer | Grade name | M component content[1] (% by weight) | Melt viscosity[2] (Pa · s) |
|---|---|---|---|---|---|
| Resin a | Styrene-methyl methacrylate copolymer | Nippon Steel Chemical Co., Ltd. | ESTYRENE MS600 | 60 | 2570 |
| Resin b | Styrene-methyl methacrylate copolymer | Nippon Steel Chemical Co., Ltd. | ESTYRENE MS300 | 30 | 1430 |

TABLE 3-continued

| Abbreviation | Type | Manufacturer | Grade name | M component content*[1] (% by weight) | Melt viscosity*[2] (Pa·s) |
|---|---|---|---|---|---|
| Resin c | Styrene-methyl methacrylate copolymer | Nippon Steel Chemical Co., Ltd. | ESTYRENE MS200 | 20 | 1750 |
| Resin d | Styrene-methyl methacrylate copolymer | Nippon A&L Inc. | ATRATE MM-70 | 70 | 1750 |
| Resin e | Styrene-methyl methacrylate copolymer | Nippon A&L Inc. | ATRATE MM-50 | 50 | 1880 |
| Resin g | Styrene-methyl methacrylate copolymer | Nippon A&L Inc. | ATRATE MM-60HF | 60 | 2220 |
| Resin h | Styrene-methyl methacrylate copolymer | Nippon A&L Inc. | PLANELOY KM-2AHF | 20 | 1420 |
| Resin i | Styrene-methyl methacrylate copolymer | | | 60 | 3010 |
| Resin j | Styrene-methyl methacrylate copolymer | Nippon Steel Chemical Co., Ltd. | ESTYRENE MS200 LF | 20 | 2070 |

*[1]Content of (meth)acrylate component in the resin (A)
*[2]Measured at 200° C. and a shear rate of 100/s.

[Preparation of Resin i in Table 3]

18 kg of deionized water, 21 g of tricalcium phosphate (manufactured by Taihei Chemical Industrial Co., Ltd.) as the suspending agent, 14 g of disodium dodecyldiphenyl ether sulfonate (PELEX SSH manufactured by Kao Corporation, 50% aqueous solution) as the surfactant, and 27 g of sodium acetate as the electrolyte were put into an autoclave having an internal volume of 50 L and equipped with a stirring device. Subsequently, 18 g of t-butyl peroxy-2-ethylhexanoate (PERBUTYL O manufactured by N of Corporation) and 18 g of t-butyl peroxy-2-ethylhexyl monocarbonate (PERBUTYL E manufactured by N of Corporation) as the initiator, and 46 g of an α-methylstyrene dimer (NOFMER MSD manufactured by N of Corporation) as the chain transferring agent were dissolved in 8.5 kg of methyl methacrylate and 5.7 kg of styrene monomer, and the solution was put into the autoclave under stirring at 230 rpm. After the atmosphere in the autoclave was substituted with nitrogen, the temperature was increased to 90° C. over a period of an hour and a half at a constant rate of temperature increase. After the temperature reached 90° C., the temperature was kept at 90° C. for 5 hours. The temperature was further increased to 120° C. over a period of 2 hours at a constant rate of temperature increase, and kept at 120° C. for 4 hours. Thereafter, the temperature was decreased to 30° C. over a period of about 3 hours. During the temperature increase, 42 g of a 0.1% aqueous solution of potassium persulfate was added as a suspension aid when the temperature reached 60° C. After cooling, the content was taken out from the autoclave, dehydrated with a centrifugal machine, and moisture was removed from the surface with a fluidized dryer. Thus, a methyl methacrylate-styrene copolymer containing methyl methacrylate at a ratio of 60% by weight was obtained.

[Measurement of Melt Viscosity]

The melt viscosity of the resins in Tables 2 and 4 was measured under the following conditions using CAPIROGRAPH 1D manufactured by Toyo Seiki Co., Ltd. A capillary having a hole diameter of 1.0 mm and a length of 10 mm was attached to the tip of a cylinder having an inner diameter of 9.55 mm (effective length: 250 mm), the cylinder and capillary was heated to 200° C., and the measurement sample (resin pellets) was filled in the cylinder. After the filling operation, the piston was inserted into the cylinder, and the sample was molten by preheating for 4 minutes. During the preheating, the piston was temporarily pressed down thereby sufficiently removing bubbles from the molten sample. The sample was filled in an amount enough for leaving 15 cc or more after removal of bubbles. After completion of the preheating, the sample in the cylinder was extruded with the piston such that the shear rate at the capillary was 100/s, and the melt viscosity at that time was measured. The melt viscosity was measured after the extrusion load was stabilized. The temperature of the melting/mixing unit of the extruder and the shear rate varies with the areas, but the temperature is usually 180 to 230° C., and the shear rate is usually 50 to 200/s. Therefore, 200° C. and 100/s were used for the sake of convenience.

Nucleating agent for adjusting the cell diameter: a talc master batch composed of 35% by weight of polystyrene, 60% by weight of talc (HIGH FILLER #12, manufactured by Matsumura Sangyo Co., Ltd.), and 5% by weight of a dispersant Flame retardant A: a flame retardant master batch containing 93% by weight of hexabromocyclododecane

TABLE 4

| Abbreviation | Type | Manufacturer | Grade name | M component content*[1] (% by weight) | Melting viscosity*[2] (Pa·s) |
|---|---|---|---|---|---|
| Resin f | Polymethyl methacrylate | Mitsubishi Rayon Co., Ltd. | ACRYPET MF001 | 100 | 2440 |
| Resin k | Polymethyl methacrylate | Sumitomo Chemical Co., Ltd. | SUMIPEX LG35 | 100 | 1920 |

*[1]Content of (meth)arylate component in the resin (A)
*[2]Measured at 200° C. and a shear rate of 100/s.

Flame retardant B: a flame retardant master batch containing 93% by weight of 2,2-bis[4-(2,3-dibromo-2-methylpropoxy)-3,5-dibromophenyl]propane Examples 1 to 15, 17 to 34

Comparative Example 1 to 10, 12 to 16

In the manufacturing apparatus used herein, a first extruder having an inside diameter of 65 mm, a second extruder having an inside diameter of 90 mm, and a third extruder having an inside diameter of 150 mm are connected in series, a blowing agent inlet is provided near the end of the first extruder, and a flat die with a resin outlet (die lip) having a gap of 1 mm, a width of 90 mm, and a rectangular cross section is connected to the outlet of the third extruder.

At the resin outlet of the third extruder, a shaping device (guider) composed of upper and lower polytetrafluoroethylene resin plates is provided in parallel with the resin outlet.

The resin, flame retardant, and nucleating agent were fed into the first extruder in amounts listed in Tables 5 to 9 and 11 to 15, molten and mixed together at 220° C. Subsequently, a predetermined amount of the blowing agent having the ingredients listed in Tables 5 to 9 and 11 to 15 was fed to the melt from the blowing agent inlet provided at the tip of the first extruder, and they were molten and mixed together to make a foamable molten resin composition. The composition was fed into the subsequent second and third extruders, and the resin temperature was adjusted to the temperature suitable for foaming as shown in the Tables (referred to as foaming temperature in the Tables; the foaming temperature is the temperature of the foamable molten resin composition measured at the interface between the extruder and the die). Subsequently, the composition was extruded from the die lip into the guider at an ejection rate of 50 kg/hr, and foamed and molded into a board shape by being passed through guiders disposed in parallel at intervals of 28 mm along the thickness direction of the extruded foam. In this way, extruded styrenic resin foam boards were produced.

In Tables 5 to 15, the mixing ratios of the styrenic resin and styrene-(meth)acrylic ester copolymer are values with reference to 100% by weight of the styrenic resin mixture. For example, in the section of Example 11 in Table 7, 10/50 and 40 written below PS1/PS2 and resin a, respectively, means that the mixing ratios of PS1, PS2, and the resin a are 10% by weight, 50% by weight, and 40% by weight, respectively. In the section of Example 24 in Table 12, 24/50 and 16/10 written below PS1/PS2 and resin a/resin c, respectively, means that the mixing ratio of PS1 is 24% by weight, PS2 is 50% by weight, the resin a containing the M component at a ratio of 60% by weight is 16% by weight, and the resin c containing the M component at a ratio of 20% by weight is 10% by weight.

Example 16

Comparative Example 11

In the manufacturing apparatus used herein, a first extruder having an inside diameter of 150 mm and a second extruder having an inside diameter of 200 mm are connected in series, a blowing agent inlet is provided near the end of the first extruder, and a flat die with a resin outlet (die lip) having a gap of 1 mm, a width of 440 mm, and a rectangular cross section is connected to the outlet of the second extruder.

At the resin outlet of the second extruder, a shaping device (guider) composed of upper and lower polytetrafluoroethylene resin plates is provided in parallel with the resin outlet.

The resin, flame retardant, and nucleating agent were fed into the first extruder in amounts listed in Table 10, molten and mixed together at 220° C. Subsequently, a predetermined amount of the blowing agent having the ingredients listed in Table 10 was fed to the melt from the blowing agent inlet provided at the tip of the first extruder, and they were molten and mixed together to make a foamable molten resin composition. The composition was fed into the subsequent second extruder, and the resin temperature was adjusted to the temperature suitable for foaming as shown in Table 10 (referred to as foaming temperature in Table 10; the foaming temperature is the temperature of the foaming molten resin composition measured at the interface between the extruder and the die). Subsequently, the composition was extruded from the die lip into the guider at an ejection rate of 500 kg/hr, and foamed and molded into a board shape by being passed through guiders disposed in parallel at intervals of 28 mm along the thickness direction of the extruded foam. In this way, extruded styrenic resin foam boards were produced.

Example 35 to 44

Comparative Example 17

In the manufacturing apparatus used herein, a first extruder having an inside diameter of 150 mm and a second extruder having an inside diameter of 200 mm are connected in series, a blowing agent inlet is provided near the end of the first extruder, and a flat die with a resin outlet (die lip) having a gap of 2 mm, a width of 440 mm, and a rectangular cross section is connected to the outlet of the second extruder.

At the resin outlet of the second extruder, a shaping device (guider) composed of upper and lower polytetrafluoroethylene resin plates is provided in parallel with the resin outlet.

The resin, flame retardant, and nucleating agent were fed into the first extruder in amounts listed in Tables 18 to 20, molten and mixed together at 220° C. Subsequently, a predetermined amount of the blowing agent having the ingredients listed in Tables 18 to 20 was fed to the melt from the blowing agent inlet provided at the tip of the first extruder, and they were molten and mixed together to make a foamable molten resin composition. The composition was fed into the subsequent second extruder, and the resin temperature was adjusted to the temperature suitable for foaming as shown in Tables 18 to 20 (referred to as foaming temperature in Tables 18 to 20; the foaming temperature is the temperature of the foaming molten resin composition measured at the interface between the extruder and the die). Subsequently, the composition was extruded from the die lip into the guider at an ejection rate of 500 kg/hr, and foamed and molded into a board shape by being passed through guiders disposed in parallel at intervals of 50 mm along the thickness direction of the extruded foam. In this way, extruded styrenic resin foam boards were produced.

Tables 5 to 15, 18 and 19 list the evaluation of the foamability and moldability, apparent density, width direction vertical sectional area, thickness, closed cell ratio, average cell diameter in the thickness direction, rate of cell deformation, blowing agent residue, thermal conductivity, rate of decrease of thermal conductivity, and evaluation of flame retardancy of the obtained extruded foam boards. The rate of decrease of thermal conductivity is calculated by dividing the thermal conductivity of the extruded foam of the present invention prepared from a styrenic resin and a styrene-(meth)acrylic ester copolymer styrenic resin by the thermal conductivity of the extruded foam prepared from a styrenic resin alone. Tables 16 and 17 list the bending properties of the extruded foams.

The M component listed in Tables 5 to 15, 18 and 19 means a (meth)acrylic ester component. The M component content in the styrenic resin mixture is calculated by multiplying the M component content in the resin (A) by the mixing ratio of the resin (A) in the styrenic resin mixture.

In Tables 5 to 15, 18 and 19, MeCl, i-B, $CO_2$, DME, i-P, and c-P listed in the section of the type of the blowing agent means methyl chloride, isobutane, carbon dioxide, dimethyl ether, isopentane, and cyclopentane, respectively. The additive amount of the blowing agent is based on molar ratio, and refers to the number of moles with reference to 1 kg of the styrenic resin mixture. For example, in the section of Example 1 in Table 5, MeCl/i-B=50/50, 1.2 mol/kg means that 1.2 moles of a blowing agent containing methyl chloride and isobutane at a molar ratio of 50 to 50 are added to 1 kg of the styrenic resin mixture.

In Tables 5 to 15, 18 and 19, the additive amounts of the flame retardant master batch and the nucleating agent master batch are for 100 parts by weight of the styrenic resin mixture.

In Tables 5 to 15, the blowing agent residue and thermal conductivity were those measured at 100 days after the production of the foams. In Tables 18 and 19, the blowing agent residue and thermal conductivity were those measured by conducting the below-described accelerated test. The blowing agent residue was measured at 10 days after the production of the foams, which corresponds to the value measured at 250 days after the production. The thermal conductivity was measured at 100 days after the production of the foams, which corresponds to the value measured at 2500 days after the production.

[Evaluation of Layered Dispersion]

Under the above-described method, micrographs of the section of the cell membrane region of the foam board were taken at a magnification of 10,000 using a transmission electron microscope (transmission electron microscope "JEM-1010", manufactured by JEOL Ltd., accelerating voltage: 100 kV), and the layered dispersion was visually observed and evaluated based on the following criteria.

When the layers were so fine that discrimination was difficult at the magnification of 10,000, the magnification was increased to 40,000.

layered: Most of the resin (B) is dispersed in layers.

Not layered: Much of the resin (B) is scattered in granular form.

[Average Number of Layers and Abundance of Resin (A)]

Under the above-described method, micrographs of the section the cell membrane region of the foam board was taken using a transmission electron microscope at a magnification of 10,000 or 40,000. On the micrographs, 20 line segments orthogonal to the cell membrane region were drawn on all over the section of the cell membrane region at regular intervals. Under the above-described method, the average number of layers and abundance were determined from the number of the resin (A) (island components) intersecting the line segments.

[Measurement of Thermal Conductivity]

The thermal conductivity listed in Tables 5 to 15 was measured as follows. A test piece having no molded skins was cut out from the extruded foam immediately after the production in a dimension of 200 mm×200 mm×25 mm, and the test piece was stored at 23° C. and a humidity of 50%. 100 days after the production, the thermal conductivity of the test piece was measured according to the flat plate heat flow meter method defined in JIS A1412-2 (1999) (heat flow meter with two plates, high temperature side 35° C., low temperature side 5° C., average temperature 20° C.).

The thermal conductivity listed in Tables 18 and 19 was measured as follows. In order to evaluate the thermal conductivity of the extruded foams after a lapse of a long period of time, the thermal conductivity of the extruded foams was measured by conducting accelerated test according to ISO 11561. More specifically, skin layers on the both sides of the foam board sample immediately after the production were equally shaved to leave a layer at 10 mm thick in the center. The sample was stored for a predetermined period in a constant temperature and humidity environment (temperature: 23° C., humidity: 50%). Under the method, for example, when a 50 mm thick foam board is sliced into a 10 mm thick plate, the thermal conductivity of the plate measured at 10 days after the production corresponds to the thermal conductivity of a 50 mm thick foam board measured at 250 days after the production, and the thermal conductivity of the plate measured at 100 days after the production corresponds to the thermal conductivity of the board at 2500 days after the production. The thermal conductivity of the foams was measured under the above-described method at 10 and 100 days after the preparation of the samples.

[Evaluation of Foamability and Moldability]

The evaluation of foamability and moldability listed in Tables 5 to 15, 18 and 19 was made on basis of the following criteria:

good: a good extruded foam board is stably produced with no ripple on its surface;

poor: the surface state of the resultant extruded foam board is not good.

[Evaluation of Flame Retardancy]

The evaluation of flame retardancy listed in Tables 5 to 15, 18 and 19 was made according to the flammability specifications for heat insulating boards made of extruded polystyrene foam defined in JIS A9511 (2006) 5.13.1 "Measurement Method A". Test pieces cut out from the extruded foam board 5 days after the production were subjected to the evaluation.

Five test pieces were cut out from one extruded foam, and evaluated on the basis of the following criteria. More specifically, in the flammability evaluation according to the JIS A 9511 (2006) 5.13.1 Measurement Method A:

Very good: the flame burn out within 3 seconds on all the test pieces;

good: the average combustion time of five test pieces is within 3 seconds, but the flame does not burn out on one or more test pieces within 3 seconds;

poor: the average combustion time of five test pieces is more than 3 seconds.

[Measurement of Bending Properties]

The bending properties of the extruded foam listed in Tables 16 and 17 were measured according to JIS K 7221-2 (1999). A test piece having no molded skins was cut out from an extruded foam board 5 days after the production with a length 200 mm, a width of 50 mm, and a thickness 25 mm in such a manner that the length direction of the test piece was along the width direction of the extruded foam, and the middle point in the width direction was the center in the length direction. The test piece was tested to determine its bending strength, deflection in bending fracture and apparent bend elastic constant under following conditions: the radius of the wedged penetrator and support tip, 10 mm; span, 150 mm; and test speed, 10 mm/min. Deflection in bending fracture refers to the deflection when the test piece was fractured.

[Measurement of Compression Properties]

The compression strength was measured as follows. A cuboid was cut from the center of the extruded foam board in the width direction. The length in the extrusion direction was 50 mm, the width was 50 mm, and the thickness was the same as the extruded foam board, and the skin layers were not removed. At that time, the center of the test piece in the width direction was the same as the center of the extruded foam board in the width direction. The test piece was compressed at a rate of 10%×T mm/minute (wherein T is the initial thickness of the test piece), and the load under 10% compression was determined according to JIS K7220 (1999). The load was divided by the pressure receiving area of the test piece to determine the compression strength.

TABLE 5

|  |  |  |  | Example 1 | Example 2 | Example 3 | Example 4 | Example 5 |
|---|---|---|---|---|---|---|---|---|
| Production conditions | Styrenic resin (B) | Type | | PS1 | PS1 | PS1 | PS1 | PS1 |
| | | Mixing ratio | % by weight | 90 | 80 | 60 | 50 | 60 |
| | Resin (A) | Type | | Resin a | Resin a | Resin a | Resin a | Resin b |
| | | M component content | % by weight | 60 | 60 | 60 | 60 | 30 |
| | | Mixing ratio | % by weight | 10 | 20 | 40 | 50 | 40 |
| | M component content in styrenic resin mixture | | % by weight | 6 | 12 | 24 | 30 | 12 |
| | Blowing agent | Type | | MeCl/i-B = 50/50 | MeCl/i-B = 50/50 | MeCl/i-B = 50/50 | MeCl/i-B = 50/50 | MeCl/i-B = 50/50 |
| | | Amounts | mole/kg | 1.2 | 1.2 | 1.2 | 1.2 | 1.2 |
| | Flame retardant master batch | Type | | Flame retardant A | Flame retardant A | Flame retardant A* | Flame retardant A | Flame retardant A |
| | | | Parts by weight | 3.2 | 3.2 | 5.4 | 7.5 | 3.2 |
| | Nucleating agent master batch | | Parts by weight | 4.2 | 4.2 | 4.2 | 4.2 | 4.2 |
| | Foamed resin temperature | | °C. | 125 | 125 | 125 | 127 | 125 |
| | Ejection rate | | kg/hr | 50 | 50 | 50 | 50 | 50 |
| | Die pressure | | MPa | 55 | 57 | 56 | 72 | 57 |
| Evaluation of foamability and moldability | | | | good | good | good | good | good |
| Physical properties of extruded foam board | Apparent density | | kg/m$^3$ | 35 | 35 | 35 | 35 | 35 |
| | Sectional area | | cm$^2$ | 60 | 60 | 60 | 60 | 60 |
| | Thickness | | mm | 28 | 28 | 28 | 28 | 28 |
| | Closed cell ratio | | % | 95 | 95 | 95 | 92 | 94 |
| | Average cell diameter along the thickness direction | | mm | 0.15 | 0.15 | 0.15 | 0.15 | 0.15 |
| | Cell deformation ratio | | | 1.1 | 1.1 | 1.1 | 1.1 | 1.1 |
| | Blowing agent residue | | % by weight | 2.9 | 3.0 | 3.0 | 3.1 | 3.0 |
| | Thermal conductivity | | W/(m·K) | 0.0288 | 0.0283 | 0.0271 | 0.0267 | 0.0286 |
| | Rate of decrease of thermal conductivity | | | 0.986 | 0.969 | 0.928 | 0.914 | 0.979 |
| | Evaluation of flame retardancy | | | very good | very good | very good | good | very good |

*In Example 3, in addition to the flame retardant A, 0.2 parts by weight of 2,3-dimethyl-2,3-diphenylbutane was added as an additional flame retardant.

TABLE 6

|  |  |  |  | Example 6 | Example 7 | Example 8 | Example 9 | Example 10 |
|---|---|---|---|---|---|---|---|---|
| Production conditions | Styrenic resin (B) | Type | | PS1 | PS1 | PS1 | PS1 | PS1 |
| | | Mixing ratio | % by weight | 40 | 52 | 65.7 | 60 | 60 |
| | Resin (A) | Type | | Resin c | Resin e | Resin d | Resin a | Resin a |
| | | M component content | % by weight | 20 | 50 | 70 | 60 | 60 |
| | | Mixing ratio | % by weight | 60 | 48 | 34.3 | 40 | 40 |
| | M component content in styrenic resin mixture | | % by weight | 12 | 24 | 24 | 24 | 24 |
| | Blowing agent | Type | | MeCl/i-B = 50/50 | MeCl/i-B = 50/50 | MeCl/i-B = 50/50 | MeCl/i-B = 50/50 | MeCl/i-B = 45/55 |
| | | Amounts | mole/kg | 1.2 | 1.2 | 1.2 | 1.2 | 1.15 |
| | Flame retardant master batch | Type | | Flame retardant A | Flame retardant A | Flame retardant A | Flame retardant B | Flame retardant A |
| | | | Parts by weight | 5.4 | 5.4 | 5.4 | 5.4 | 5.4 |
| | Nucleating agent master batch | | Parts by weight | 4.2 | 4.2 | 4.2 | 4.2 | 4.2 |
| | Foamed resin temperature | | °C. | 125 | 125 | 125 | 125 | 125 |
| | Ejection rate | | kg/hr | 50 | 50 | 50 | 50 | 50 |
| | Die pressure | | MPa | 55 | 60 | 60 | 57 | 72 |
| Evaluation of foamability and moldability | | | | good | good | good | good | good |
| Physical properties of | Apparent density | | kg/m$^3$ | 35 | 35 | 35 | 35 | 37.5 |
| | Sectional area | | cm$^2$ | 60 | 60 | 60 | 60 | 60 |
| | Thickness | | mm | 28 | 28 | 28 | 28 | 28 |

TABLE 6-continued

|  |  |  | Example 6 | Example 7 | Example 8 | Example 9 | Example 10 |
|---|---|---|---|---|---|---|---|
| extruded foam board | Closed cell ratio | % | 95 | 94 | 94 | 94 | 92 |
|  | Average cell diameter along the thickness direction | mm | 0.15 | 0.15 | 0.15 | 0.15 | 0.15 |
|  | Cell deformation ratio |  | 1.1 | 1.1 | 1.1 | 1.1 | 1.1 |
|  | Blowing agent residue | % by weight | 3.0 | 3.0 | 3.0 | 3.0 | 3.1 |
|  | Thermal conductivity | W/(m · K) | 0.0286 | 0.0272 | 0.0270 | 0.0272 | 0.0265 |
|  | Rate of decrease of thermal conductivity |  | 0.979 | 0.931 | 0.925 | 0.932 | 0.927 |
|  | Evaluation of flame retardancy |  | very good | good | good | very good | good |

TABLE 7

|  |  |  |  | Example 11 | Example 12 | Example 13 | Example 14 | Example 15 |
|---|---|---|---|---|---|---|---|---|
| Production conditions | Styrenic resin (B) | Type |  | PS1/PS2 | PS3 | PS1 | PS1 | PS2/PS1 |
|  |  | Mixing ratio | % by weight | 10/50 | 60 | 80 | 60 | 70/10 |
|  | Resin (A) | Type |  | Resin a | Resin a | Resin a | Resin a | Resin a |
|  |  | M component content | % by weight | 60 | 60 | 60 | 60 | 60 |
|  |  | Mixing ratio | % by weight | 40 | 40 | 20 | 40 | 20 |
|  | M component content in styrenic resin mixture |  | % by weight | 24 | 24 | 12 | 24 | 12 |
|  | Blowing agent | Type |  | i-B/DME/$CO_2$ = 50/35/15 | MeCl/i-B = 50/50 | MeCl/i-B = 85/15 | MeCl/i-B = 85/15 | $CO_2$ |
|  |  | Amounts | mole/kg | 1.2 | 1.2 | 1.6 | 1.6 | 1.0 |
|  | Flame retardant master batch | Type |  | Flame retardant A | Flame retardant A | Flame retardant A | Flame retardant A | Flame retardant A |
|  |  | Parts by weight |  | 5.4 | 5.4 | 3.2 | 5.4 | 3.2 |
|  | Nucleating agent master batch | Parts by weight |  | 2.5 | 4.2 | 0.8 | 0.8 |  |
|  | Foamed resin temperature |  | ° C. | 125 | 125 | 125 | 125 | 125 |
|  | Ejection rate |  | kg/hr | 50 | 50 | 50 | 50 | 50 |
|  | Die pressure |  | MPa | 60 | 57 | 38 | 40 | 95 |
|  | Evaluation of foamability and moldability |  |  | good | good | good | good | good |
| Physical properties of extruded foam board | Apparent density |  | kg/m³ | 35 | 35 | 26 | 26 | 35 |
|  | Sectional area |  | cm² | 65 | 65 | 60 | 60 | 60 |
|  | Thickness |  | mm | 28 | 28 | 28 | 28 | 28 |
|  | Closed cell ratio |  | % | 94 | 95 | 95 | 95 | 87 |
|  | Average cell diameter along the thickness direction |  | mm | 0.15 | 0.15 | 0.35 | 0.35 | 0.40 |
|  | Cell deformation ratio |  |  | 1.1 | 1.1 | 1.1 | 1.1 | 1.1 |
|  | Blowing agent residue |  | % by weight | 3.1 | 3.0 | 1.3 | 1.3 | 0 |
|  | Thermal conductivity |  | W/(m · K) | 0.0273 | 0.0271 | 0.0373 | 0.0361 | 0.0386 |
|  | Rate of decrease of thermal conductivity |  |  | 0.928 | 0.932 | 0.976 | 0.945 | 0.977 |
|  | Evaluation of flame retardancy |  |  | good | good | very good | good | very good |

TABLE 8

|  |  |  |  | Comparative Example 1 | Comparative Example 2 | Comparative Example 3 | Comparative Example 4 | Comparative Example 5 |
|---|---|---|---|---|---|---|---|---|
| Production conditions | Styrenic resin (B) | Type |  | PS1 | PS1 | PS1 |  | PS1 |
|  |  | Mixing ratio | % by weight | 100 | 95 | 20 |  | 88 |
|  | Resin (A) | Type |  |  | Resin a | Resin a | Resin a | (Resin f) |
|  |  | M component content | % by weight |  | 60 | 60 | 60 | 100 |
|  |  | Mixing ratio | % by weight |  | 5 | 80 | 100 | 12 |
|  | M component content in styrenic resin mixture |  | % by weight | 0 | 3 | 48 | 60 | 12 |
|  | Blowing agent | Type |  | MeCl/i-B = 50/50 | MeCl/i-B = 50/50 | MeCl/i-B = 50/50 | MeCl/i-B = 50/50 | MeCl/i-B = 50/50 |
|  |  | Amounts | mole/kg | 1.2 | 1.2 | 1.2 | 1.2 | 1.2 |

TABLE 8-continued

|  |  |  | Comparative Example 1 | Comparative Example 2 | Comparative Example 3 | Comparative Example 4 | Comparative Example 5 |
|---|---|---|---|---|---|---|---|
|  | Flame retardant master batch | Type | Flame retardant A | Flame retardant A | Flame retardant A | Flame retardant A | Flame retardant A |
|  |  | Parts by weight | 3.2 | 3.2 | 7.5 | 7.5 | 3.2 |
|  | Nucleating agent master batch | Parts by weight | 4.2 | 4.2 | 4.2 | 4.2 | 4.2 |
|  | Foamed resin temperature | °C. | 125 | 125 | 125 | 125 | 125 |
|  | Ejection rate | kg/hr | 50 | 50 | 50 | 50 | 50 |
|  | Die pressure | MPa | 48 | 50 | 81 | 81 | 40 |
| Evaluation of foamability and moldability |  |  | good | good | good | good | poor |
| Physical properties of extruded foam board | Apparent density | kg/m³ | 35 | 35 | 35 | 35 | not evaluated |
|  | Sectional area | cm² | 60 | 60 | 60 | 60 | not evaluated |
|  | Thickness | mm | 28 | 28 | 28 | 28 | not evaluated |
|  | Closed cell ratio | % | 95 | 95 | 92 | 90 | not evaluated |
|  | Average cell diameter along the thickness direction | mm | 0.15 | 0.15 | 0.15 | 0.15 | not evaluated |
|  | Cell deformation ratio |  | 1.1 | 1.1 | 1.1 | 1.1 | not evaluated |
|  | Blowing agent residue | % by weight | 2.9 | 2.9 | 2.9 | 2.9 | not evaluated |
|  | Thermal conductivity | W/(m·K) | 0.0292 | 0.0293 | 0.0269 | 0.0272 | not evaluated |
|  | Rate of decrease of thermal conductivity |  |  | 1.00 | 0.921 | 0.931 | not evaluated |
|  | Evaluation of flame retardancy |  | very good | very good | poor | poor | not evaluated |

*In Comparative Example 5, no favorable foam was obtained because of poor formability and moldability.

TABLE 9

|  |  |  |  | Comparative Example 6 | Comparative Example 7 | Comparative Example 8 | Comparative Example 9 | Comparative Example 10 |
|---|---|---|---|---|---|---|---|---|
| Production conditions | Styrenic resin (B) | Type |  | PS1 | PS1/PS2 | PS3 | PS1 | PS2/PS1 |
|  |  | Mixing ratio | % by weight | 100 | 50/50 | 100 | 100 | 87.5/12.5 |
|  | Resin (A) | Type |  |  |  |  |  |  |
|  |  | M component content | % by weight |  |  |  |  |  |
|  |  | Mixing ratio | % by weight |  |  |  |  |  |
|  | M component content in styrenic resin mixture |  | % by weight | 0 | 0 | 0 | 0 | 0 |
|  | Blowing agent | Type |  | MeCl/i-B = 45/55 | i-B/DME/CO₂ = 50/35/15 | MeCl/i-B = 50/50 | MeCl/i-B = 85/15 | CO₂ |
|  |  | Amounts | mole/kg | 1.15 | 1.2 | 1.2 | 1.6 | 1.0 |
|  | Flame retardant master batch | Type |  | Flame retardant A | Flame retardant A | Flame retardant A | Flame retardant A | Flame retardant A |
|  |  | Parts by weight |  | 3.2 | 3.2 | 3.2 | 3.2 | 3.2 |
|  | Nucleating agent master batch | Parts by weight |  | 4.2 | 2.5 | 4.2 | 0.8 |  |
|  | Foamed resin temperature |  | °C. | 125 | 125 | 125 | 125 | 125 |
|  | Ejection rate |  | kg/hr | 50 | 50 | 50 | 50 | 50 |
|  | Die pressure |  | MPa | 72 | 48 | 57 | 36 | 88 |
| Evaluation of foamability and moldability |  |  |  | good | good | good | good | good |
| Physical properties of extruded foam board | Apparent density |  | kg/m³ | 37.5 | 35 | 35 | 26 | 35 |
|  | Sectional area |  | cm² | 60 | 60 | 65 | 60 | 60 |
|  | Thickness |  | mm | 28 | 28 | 28 | 28 | 28 |
|  | Closed cell ratio |  | % | 92 | 94 | 94 | 95 | 82 |
|  | Average cell diameter along the thickness direction |  | mm | 0.15 | 0.15 | 0.15 | 0.35 | 0.40 |
|  | Cell deformation ratio |  |  | 1.1 | 1.1 | 1.1 | 1.1 | 1.1 |
|  | Blowing agent residue |  | % by weight | 3.0 | 2.9 | 2.9 | 1.0 | 0 |
|  | Thermal conductivity |  | W/(m·K) | 0.0286 | 0.0294 | 0.0291 | 0.0382 | 0.0395 |
|  | Rate of decrease of thermal conductivity |  |  |  |  |  |  |  |
|  | Evaluation of flame retardancy |  |  | very good | very good | very good | very good | very good |

TABLE 10

|  |  |  |  | Example 16 | Comparative Example 11 |
|---|---|---|---|---|---|
| Production conditions | Styrenic resin (B) | Type |  | PS1 | PS1 |
|  |  | Mixing ratio | % by weight | 60 | 100 |
|  | Resin (A) | Type |  | Resin a |  |
|  |  | M component content | % by weight | 60 |  |

TABLE 10-continued

|  |  |  | Example 16 | Comparative Example 11 |
|---|---|---|---|---|
|  | Mixing ratio | % by weight | 40 |  |
|  | M component content in styrenic resin mixture | % by weight | 24 | 0 |
|  | Blowing agent | Type |  MeCl/i-B = 45/55 | MeCl/i-B = 45/55 |
|  |  | Amounts | mole/kg | 1.15 | 1.15 |
|  | Flame retardant master batch | Type | Flame retardant A | Flame retardant A |
|  |  | Parts by weight | 5.4 | 3.2 |
|  | Nucleating agent master batch | Parts by weight | 4.2 | 4.2 |
|  | Foamed resin temperature | °C. | 125 | 125 |
|  | Ejection rate | kg/hr | 500 | 500 |
|  | Die pressure | MPa | 60 | 53 |
| Evaluation of foamability and moldability |  |  | good | good |
| Physical properties of extruded foam board | Apparent density | kg/m³ | 37.5 | 37.5 |
|  | Sectional area | cm² | 300 | 300 |
|  | Thickness | mm | 28 | 28 |
|  | Closed cell ratio | % | 95 | 94 |
|  | Average cell diameter along the thickness direction | mm | 0.15 | 0.15 |
|  | Cell deformation ratio |  | 1.0 | 1.0 |
|  | Blowing agent residue (after 100 days) | % by weight | 3.1 | 3.0 |
|  | Thermal conductivity (after 100 days) | W/(m·K) | 0.0261 | 0.0282 |
|  | Rate of decrease of thermal conductivity |  | 0.926 |  |
|  | Evaluation of flame retardancy |  | good | very good |

TABLE 11

|  |  |  |  | Example 17 | Example 18 | Example 19 | Example 20 | Example 21 |
|---|---|---|---|---|---|---|---|---|
| Production conditions | Styrenic resin (B) | Type |  | PS1 | PS1 | PS1 | PS1 | PS1 |
|  |  | Mixing ratio | % by weight | 60 | 20 | 60 | 60 | 80 |
|  | Resin (A) | Type |  | Resin a | Resin b | Resin a | Resin a | Resin a |
|  |  | M component content | % by weight | 60 | 30 | 60 | 60 | 60 |
|  |  | Mixing ratio | % by weight | 40 | 80 | 40 | 40 | 20 |
|  | M component content in styrenic resin mixture |  | % by weight | 24 | 24 | 24 | 24 | 12 |
|  | Blowing agent | Type |  | MeCl/i-B/n-B = 50/15/35 | MeCl/i-B/n-B = 50/15/35 | MeCl/i-P = 70/30 | MeCl/i-B/n-B = 85/5/10 | MeCl/i-B/c-P = 50/25/25 |
|  |  | Amounts | mole/kg | 1.2 | 1.2 | 1.2 | 1.6 | 1.2 |
|  | Flame retardant master batch | Type |  | Flame retardant A | Flame retardant A | Flame retardant A | Flame retardant A | Flame retardant A |
|  |  | Parts by weight |  | 5.4 | 5.4 | 5.4 | 5.4 | 5.4 |
|  | Nucleating agent master batch | Parts by weight |  | 4.2 | 4.2 | 4.2 | 0.8 | 4.2 |
|  | Foamed resin temperature | °C. |  | 125 | 125 | 125 | 125 | 125 |
|  | Ejection rate | kg/hr |  | 50 | 50 | 50 | 50 | 50 |
|  | Die pressure | MPa |  | 50 | 60 | 50 | 40 | 38 |
| Evaluation of foamability and moldability |  |  |  | good | good | good | good | good |
| Physical properties of extruded form board | Apparent density | kg/m³ |  | 35 | 35 | 35 | 26 | 35 |
|  | Sectional area | cm² |  | 60 | 60 | 60 | 60 | 60 |
|  | Thickness | mm |  | 28 | 28 | 28 | 28 | 28 |
|  | Closed cell ratio | % |  | 95 | 95 | 94 | 92 | 92 |
|  | Average cell diameter along the thickness direction | mm |  | 0.15 | 0.15 | 0.15 | 0.30 | 0.15 |
|  | Cell deformation ratio |  |  | 1.1 | 1.1 | 1.1 | 1.1 | 1.1 |
|  | Blowing agent residue (after 100 days) | % by weight |  | 2.6 | 2.6 | 2.3 | 1.0 | 3.2 |
|  | Thermal conductivity (after 100 days) | W/(m·K) |  | 0.0280 | 0.0284 | 0.0284 | 0.0366 | 0.0281 |
|  | Rate of decrease of thermal conductivity |  |  | 0.930 | 0.943 | 0.934 | 0.951 | 0.962 |
|  | Evaluation of flame retardancy |  |  | very good | very good | good | very good | very good |

TABLE 12

| | | | | Example 22 | Example 23 | Example 24 | Example 25 | Example 26 |
|---|---|---|---|---|---|---|---|---|
| Production conditions | Styrenic resin (B) | Type | | PS1 | PS1 | PS1/PS2 | PS1/PS2 | PS1/PS2 |
| | | Mixing ratio | % by weight | 80 | 74 | 24/50 | 24/50 | 30/50 |
| | Resin (A) | Type | | Resin a | Resin a/Resin c | Resin a/Resin c | Resin g/Resin h | Resin a |
| | | M component content | % by weight | 60 | 60/20 | 60/20 | 60/20 | 60 |
| | | Mixing ratio | % by weight | 20 | 16/10 | 16/10 | 16/10 | 20 |
| | M component content in styrenic resin mixture | | % by weight | 12 | 12 | 12 | 12 | 12 |
| | Blowing agent | Type | | MeCl/i-B/c-P = 50/15/35 | MeCl/i-B = 50/50 | MeCl/i-B = 50/50 | MeCl/i-B = 50/50 | MeCl/i-B = 50/50 |
| | | Amounts | mole/kg | 1.2 | 1.2 | 1.2 | 1.2 | 1.2 |
| | Flame retardant master batch | Type | | Flame retardant A | Flame retardant A | Flame retardant A | Flame retardant A | Flame retardant A |
| | | | Parts by weight | 5.4 | 3.2 | 3.2 | 3.2 | 3.2 |
| | Nucleating agent master batch | | Parts by weight | 4.2 | 4.2 | 4.2 | 4.2 | 4.2 |
| | Foamed resin temperature | | °C. | 125 | 125 | 125 | 123 | 125 |
| | Ejection rate | | kg/hr | 50 | 50 | 50 | 50 | 50 |
| | Die pressure | | MPa | 35 | 57 | 33 | 32 | 32 |
| Evaluation of foamability and moldability | | | | good | good | good | good | good |
| Physical properties of extruded foam board | Apparent density | | kg/m$^3$ | 35 | 35 | 35 | 35 | 35 |
| | Sectional area | | cm$^2$ | 60 | 60 | 60 | 60 | 60 |
| | Thickness | | mm | 28 | 28 | 28 | 28 | 28 |
| | Closed cell ratio | | % | 92 | 95 | 95 | 95 | 95 |
| | Average cell diameter along the thickness direction | | mm | 0.15 | 0.15 | 0.15 | 0.15 | 0.15 |
| | Cell deformation ratio | | | 1.1 | 1.1 | 1.1 | 1.1 | 1.1 |
| | Blowing agent residue | | % by weight | 3.5 | 3.0 | 3.0 | 3.0 | 3.0 |
| | Thermal conductivity | | W/(m·K) | 0.0280 | 0.0282 | 0.0283 | 0.0281 | 0.0283 |
| | Rate of decrease of thermal conductivity | | | 0.959 | 0.966 | 0.969 | 0.962 | 0.969 |
| | Evaluation of flame retardancy | | | good | very good | very good | very good | very good |

TABLE 13

| | | | | Example 27 | Example 28 | Example 29 | Example 30 | Example 31 |
|---|---|---|---|---|---|---|---|---|
| Production conditions | Styrenic resin (B) | Type | | PS1/PS2 | PS1/PS2 | PS1/PS2 | PS1/PS2 | PS1/PS2 |
| | | Mixing ratio | % by weight | 24/50 | 24/50 | 24/50 | 24/50 | 24/50 |
| | Resin (A) | Type | | Resin a/Resin h | Resin g/Resin c | Resin g/Resin j | Resin i/Resin j | Resin i/Resin h |
| | | M component content | % by weight | 60/20 | 60/20 | 60/20 | 60/20 | 60/20 |
| | | Mixing ratio | % by weight | 16/10 | 16/10 | 16/10 | 16/10 | 16/10 |
| | M component content in styrenic resin mixture | | % by weight | 12 | 12 | 12 | 12 | 12 |
| | Blowing agent | Type | | MeCl/i-B = 50/50 | MeCl/i-B = 50/50 | MeCl/i-B = 50/50 | MeCl/i-B = 50/50 | MeCl/i-B = 50/50 |
| | | Amounts | mole/kg | 1.2 | 1.2 | 1.2 | 1.2 | 1.2 |
| | Flame retardant master batch | Type | | Flame retardant A | Flame retardant A | Flame retardant A | Flame retardant A | Flame retardant A |
| | | | Parts by weight | 3.2 | 3.2 | 3.2 | 3.2 | 3.2 |
| | Nucleating agent master batch | | Parts by weight | 6.0 | 6.0 | 6.0 | 6.0 | 6.0 |
| | Foamed resin temperature | | °C. | 123 | 123 | 123 | 125 | 125 |
| | Ejection rate | | kg/hr | 52 | 50 | 50 | 50 | 50 |
| | Die pressure | | MPa | 32 | 32 | 32 | 32 | 32 |
| Evaluation of foamability and moldability | | | | good | good | good | good | good |
| Physical properties of extruded foam board | Apparent density | | kg/m$^3$ | 35 | 35 | 35 | 35 | 35 |
| | Sectional area | | cm$^2$ | 60 | 60 | 60 | 60 | 60 |
| | Thickness | | mm | 28 | 28 | 28 | 28 | 28 |
| | Closed cell ratio | | % | 92 | 95 | 95 | 95 | 95 |
| | Average cell diameter along the thickness direction | | mm | 0.15 | 0.15 | 0.15 | 0.15 | 0.15 |
| | Cell deformation ratio | | | 1.1 | 1.1 | 1.1 | 1.1 | 1.1 |
| | Blowing agent residue | | % by weight | 3.0 | 3.0 | 3.0 | 3.0 | 3.0 |
| | Thermal conductivity | | W/(m·K) | 0.0285 | 0.0284 | 0.0283 | 0.0283 | 0.0284 |
| | Rate of decrease of thermal conductivity | | | 0.976 | 0.972 | 0.969 | 0.969 | 0.972 |
| | Evaluation of flame retardancy | | | very good | very good | very good | very good | very good |

TABLE 14

| | | | | Example 32 | Example 33 | Example 34 |
|---|---|---|---|---|---|---|
| Production conditions | Styrenic resin (B) | Type | | PS1/PS2 | PS1/PS2 | PS1/PS2 |
| | | Mixing ratio | % by weight | 4/50 | 4/50 | 10/50 |
| | Resin (A) | Type | | Resin a/Resin c | Resin g/Resin h | Resin a |
| | | M component content | % by weight | 60/20 | 60/20 | 60 |
| | | Mixing ratio | % by weight | 36/10 | 36/10 | 40 |
| | M component content in styrenic resin mixture | | % by weight | 24 | 24 | 24 |
| | Blowing agent | Type | | MeCl/i-B = 50/50 | MeCl/i-B = 50/50 | MeCl/i-B = 50/50 |
| | | Amounts | mole/kg | 1.2 | 1.2 | 1.2 |
| | Flame retardant master batch | Type | | Flame retardant A | Flame retardant A | Flame retardant A |
| | | | Parts by weight | 5.4 | 5.4 | 5.4 |
| | Nucleating agent master batch | | Parts by weight | 5.0 | 5.0 | 5.0 |
| | Foamed resin temperature | | °C. | 125 | 123 | 125 |
| | Ejection rate | | kg/hr | 50 | 50 | 50 |
| | Die pressure | | MPa | 34 | 34 | 34 |
| Evaluation of foamability and moldability | | | | good | good | good |
| Physical properties of extruded foam board | Apparent density | | kg/m$^3$ | 35 | 35 | 35 |
| | Sectional area | | cm$^2$ | 60 | 60 | 60 |
| | Thickness | | mm | 28 | 28 | 28 |
| | Closed cell ratio | | % | 93 | 95 | 91 |
| | Average cell diameter along the thickness direction | | mm | 0.15 | 0.15 | 0.15 |
| | Cell deformation ratio | | | 1.1 | 1.1 | 1.1 |
| | Blowing agent residue | | % by weight | 3.0 | 3.0 | 3.0 |
| | Thermal conductivity | | W/(m·K) | 0.0271 | 0.0271 | 0.0273 |
| | Rate of decrease of thermal conductivity | | | 0.928 | 0.928 | 0.934 |
| | Evaluation of flame retardancy | | | very good | very good | very good |

TABLE 15

| | | | | Comparative Example 12 | Comparative Example 13 | Comparative Example 14 | Comparative Example 15 | Comparative Example 16 |
|---|---|---|---|---|---|---|---|---|
| Production conditions | Styrenic resin (B) | Type | | PS1 | PS1 | PS1 | PS1 | PS1/PS2 |
| | | Mixing ratio | % by weight | 100 | 100 | 100 | 100 | 50/50 |
| | Resin (A) | Type | | | | | | |
| | | M component content | % by weight | | | | | |
| | | Mixing ratio | % by weight | | | | | |
| | M component content in styrenic resin mixture | | % by weight | 0 | 0 | 0 | 0 | 0 |
| | Blowing agent | Type | | MeCl/i-B/n-B = 50/15/35 | MeCl/i-P = 70/30 | MeCl/i-B/n-B = 85/5/10 | MeCl/i-B/c-P = 50/15/35 | MeCl/i-B = 50/50 |
| | | Amounts | mole/kg | 1.2 | 1.2 | 1.6 | 1.2 | 1.2 |
| | Flame retardant master batch | Type | | Flame retardant A | Flame retardant A | Flame retardant A | Flame retardant A | Flame retardant A |
| | | | Parts by weight | 3.2 | 3.2 | 3.2 | 5.4 | 3.2 |
| | Nucleating agent master batch | | Parts by weight | 4.2 | 4.2 | 0.8 | 6.0 | 6.0 |
| | Foamed resin temperature | | °C. | 125 | 125 | 125 | 125 | 125 |
| | Ejection rate | | kg/hr | 50 | 50 | 50 | 50 | 50 |
| | Die pressure | | MPa | 43 | 46 | 36 | 31 | 30 |
| Evaluation of foamability and moldability | | | | good | good | good | good | good |
| Physical properties of extruded foam board | Apparent density | | kg/m$^3$ | 35 | 35 | 26 | 35 | 35 |
| | Sectional area | | cm$^2$ | 60 | 60 | 60 | 60 | 60 |
| | Thickness | | mm | 28 | 28 | 28 | 28 | 28 |
| | Closed cell ratio | | % | 95 | 95 | 92 | 95 | 95 |
| | Average cell diameter along the thickness direction | | mm | 0.15 | 0.15 | 0.30 | 0.15 | 0.15 |
| | Cell deformation ratio | | | 1.1 | 1.1 | 1.1 | 1.1 | 1.1 |
| | Blowing agent residue | | % by weight | 2.3 | 2.2 | 0.8 | 3.4 | 2.9 |
| | Thermal conductivity | | W/(m·K) | 0.0301 | 0.0304 | 0.0385 | 0.0290 | 0.0292 |
| | Rate of decrease of thermal conductivity | | | | | | | |
| | Evaluation of flame retardancy | | | very good | very good | very good | good | very good |

TABLE 16

|  |  | Comparative Example 1 | Example 2 | Example 23 |
|---|---|---|---|---|
| Deflection in bending fracture | mm | 40 | 30 | 39 |
| Apparent bend elastic constant | MPa | 175 | 170 | 170 |

TABLE 17

|  |  | Comparative Example 16 | Example 26 | Example 24 | Example 25 | Example 27 | Example 28 | Example 29 | Example 30 | Example 31 |
|---|---|---|---|---|---|---|---|---|---|---|
| Deflection in bending fracture | mm | 46 | 25 | 35 | 54 | 36 | 28 | 48 | 58 | 47 |
| Apparent bend elastic constant | MPa | 140 | 110 | 120 | 125 | 125 | 121 | 131 | 128 | 132 |

TABLE 18

|  |  |  |  | Example 35 | Example 36 | Example 37 | Example 38 | Example 39 | Example 40 |
|---|---|---|---|---|---|---|---|---|---|
| Production conditions | Styrenic resin (B) | Type |  | PS1/PS2 | PS1/PS2 | PS2 | PS1/PS2 | PS1/PS2 | PS1/PS2 |
|  |  | Mixing ratio | % by weight | 26/50 | 14/50 | 52 | 26/50 | 14/50 | 26/50 |
|  | Resin (A) | Type |  | Resin g/Resin h | Resin g/Resin h | Resin g/Resin h | Resin a/Resin c | Resin a/Resin c | Resin k/Resin h |
|  |  | Mixing ratio | % by weight | 18/6 | 26/10 | 38/10 | 18/6 | 26/10 | 9/15 |
|  | M component content in styrenic resin mixture |  | % by weight | 12 | 18 | 25 | 12 | 18 | 12 |
|  | Blowing agent | Type |  | MeCl/i-B = 50/50 | MeCl/i-B = 50/50 | MeCl/i-B = 50/50 | MeCl/i-B = 50/50 | MeCl/i-B = 50/50 | MeCl/i-B = 50/50 |
|  |  | Amounts | mole/kg | 1.2 | 1.2 | 1.2 | 1.2 | 1.2 | 1.2 |
|  | Flame retardant master batch | Type |  | Flame retardant A | Flame retardant B | Flame retardant B | Flame retardant A | Flame retardant B | Flame retardant A |
|  |  | Amounts | Parts by weight | 5.4 | 5.4 | 5.4 | 5.4 | 5.4 | 5.4 |
|  | Nucleating agent master batch | Type |  | talc | talc | talc | talc | talc | talc |
|  |  | Amounts | Parts by weight | 4.2 | 4.2 | 4.2 | 4.2 | 4.2 | 4.2 |
|  | Foamed resin temperature |  | ° C. | 125 | 125 | 125 | 125 | 125 | 125 |
|  | Ejection rate |  | kg/hr | 500 | 500 | 500 | 500 | 500 | 500 |
|  | Die pressure |  | MPa | 40 | 44 | 47 | 45 | 45 | 42 |
|  | Evaluation of foamability and moldability |  |  | good | good | good | good | good | good |
| Physical properties of extruded foam board | Apparent density |  | kg/m$^3$ | 35 | 35 | 35 | 35 | 35 | 35 |
|  | Sectional area |  | cm$^2$ | 450 | 450 | 450 | 450 | 450 | 450 |
|  | Thickness |  | mm | 50 | 50 | 50 | 50 | 50 | 50 |
|  | Closed cell ratio |  | % | 95 | 95 | 94 | 95 | 94 | 95 |
|  | Average cell diameter along the thickness direction |  | mm | 0.15 | 0.15 | 0.15 | 0.15 | 0.15 | 0.15 |
|  | Cell deformation ratio |  |  | 1.0 | 1.0 | 1.0 | 1.0 | 1.0 | 1.0 |
|  | Blowing agent residue |  | % by weight | 3.0 | 3.0 | 3.0 | 3.0 | 3.0 | 3.0 |
|  | State of dispersion |  |  | layered | layered | layered | layered | layered | layered |
|  | Number of layers of resin (B) of 0.01 to 0.3 μm |  | layer | 30.4 | 35.2 | 38.8 | 7.1 | 8.2 | 5.0 |
|  | Abundance of resin (B) of 0.01 to 0.3 μm |  | % | 100 | 96 | 94 | 94 | 96 | 92 |
|  | Thermal conductivity | Estimate at 250 days after | W/(m · K) | 0.0276 | 0.0272 | 0.0270 | 0.0280 | 0.0275 | 0.0280 |
|  |  | Rate of decrease |  | 0.945 | 0.932 | 0.925 | 0.959 | 0.942 | 0.959 |
|  |  | Estimate at 2500 days after | W/(m · K) | 0.0280 | 0.0277 | 0.0276 | 0.0285 | 0.0280 | 0.0287 |
|  |  | Rate of decrease |  | 0.933 | 0.923 | 0.920 | 0.950 | 0.933 | 0.957 |
|  | Evaluation of flame retardancy |  |  | very good | very good | very good | very good | very good | very good |
|  | Bending strength |  | N/cm$^2$ | 41 | 40 | 40 | 39 | 41 | 41 |
|  | Compression strength |  | N/cm$^2$ | 22 | 21 | 20 | 21 | 20 | 25 |
|  | Deflection in bending fracture |  | mm | 54 | 45 | 40 | 42 | 40 | 45 |
|  | Apparent bend elastic constant |  | MPa | 125 | 124 | 120 | 125 | 125 | 140 |

*In Examples 37 and 41, 0.5 parts of 2,3-dimethyl-2,3-diphenylbutane were added together with the flame retardant B to 100 parts by weight of the styrenic resin mixture.

TABLE 19

| | | | Example 41 | Example 42 | Example 43 | Example 44 | Comparative Example 17 |
|---|---|---|---|---|---|---|---|
| Production conditions | Styrenic resin (B) | Type | PS2 | PS1/PS2 | PS1/PS2 | PS1/PS2 | PS1/PS2 |
| | | Mixing ratio % by weight | 52 | 14/50 | 14/50 | 30/50 | 50/50 |
| | Resin (A) | Type | — | Resin a/Resin c | Resin g/Resin h | Resin g/Resin h | Resin a |
| | | Mixing ratio % by weight | 38/10 | 26/10 | 26/10 | 20 | |
| | M component content in styrenic resin mixture | % by weight | 25 | 18 | 18 | 12 | 0 |
| | Blowing agent | Type | MeCl/i-B = 50/50 | MeCl/i-B = 50/50 | MeCl/i-B = 50/50 | MeCl/i-B = 50/50 | MeCl/i-B = 50/50 |
| | | Amounts mole/kg | 1.2 | 1.2 | 1.2 | 1.2 | 1.2 |
| | Flame retardant master batch | Type | Flame retardant B | Flame retardant B | Flame retardant B | Flame retardant A | Flame retardant A |
| | | Amounts Parts by weight | 5.4 | 5.4 | 5.4 | 5.4 | 5.4 |
| | Nucleating agent master batch | Type | talc | talc | talc | talc | talc |
| | | Amounts Parts by weight | 4.2 | 2.5 | 3.7 | 4.2 | 4.2 |
| | Foamed resin temperature | °C. | 125 | 125 | 125 | 125 | 125 |
| | Ejection rate | kg/hr | 500 | 500 | 500 | 500 | 500 |
| | Die pressure | MPa | 45 | 44 | 44 | 45 | 38 |
| Evaluation of foamability and moldability | | | good | good | good | good | good |
| Physical properties of extruded foam board | Apparent density | kg/m$^3$ | 35 | 35 | 35 | 35 | 35 |
| | Sectional area | cm$^2$ | 450 | 450 | 450 | 450 | 450 |
| | Thickness | mm | 50 | 50 | 50 | 50 | 50 |
| | Closed cell ratio | % | 93 | 93 | 94 | 95 | 95 |
| | Average cell diameter along the thickness direction | mm | 0.15 | 0.15 | 0.15 | 0.15 | 0.15 |
| | Cell deformation ratio | | 1.0 | 1.0 | 1.0 | 1.0 | 1.0 |
| | Blowing agent residue | % by weight | 3.0 | 3.0 | 3.0 | 3.0 | 2.9 |
| | State of dispersion | | layered | layered | layered | not layered | |
| | Number of layers of resin (B) of 0.01 to 0.3 μm | layer | 9.7 | 32.7 | 32.9 | 2.3 | |
| | Abundance of resin (B) of 0.01 to 0.3 μm | % | 92 | 96 | 96 | 53 | |
| | Thermal conductivity | Estimate at 250 days after W/(m·K) | 0.0275 | 0.0254 | 0.0265 | 0.0282 | 0.0292 |
| | | Rate of decrease | 0.942 | 0.870 | 0.908 | 0.966 | |
| | | Estimate at 2500 days after W/(m·K) | 0.0281 | 0.0260 | 0.0269 | 0.0287 | 0.0300 |
| | | Rate of decrease | 0.937 | 0.867 | 0.897 | 0.957 | |
| | Evaluation of flame retardancy | | very good | very good | very good | very good | very good |
| | Bending strength | N/cm$^2$ | 41 | 39 | 40 | 40 | 46 |
| | Compression strength | N/cm$^2$ | 20 | 20 | 21 | 24 | 26 |
| | Deflection in bending fracture | mm | 40 | 43 | 44 | 25 | 46 |
| | Apparent bend elastic constant | MPa | 125 | 125 | 125 | 120 | 140 |

*In Example 42, 3 parts of graphite were added to 100 parts by weight of the styrenic resin mixture.
*In Example 43, 1 part of graphite was added to 100 parts by weight of the styrenic resin mixture.

The results of Examples 1 to 44 indicate that extruded styrenic resin foams having excellent long-term heat insulating properties and excellent flame retardancy are readily produced by the method of the present invention. When the resin (A) was added to the styrenic resin (B) such that the styrenic resin mixture contained a (meth)acrylic ester component at a specific ratio, the resultant extruded foam exhibited remarkable blocking effect against radiant heat transmission, and provided better long-lasting heat insulating properties and flame retardancy than other extruded foams produced with no styrene-(meth)acrylic ester copolymer.

In Example 23, the resin (A2), which is a styrene-(meth) acrylic ester copolymer containing a (meth)acrylic ester component at a low ratio, was added to the styrenic resin (B) together with the resin (A1), which is a styrene-(meth)acrylic ester copolymer or polymethyl methacrylate containing a (meth)acrylic ester component at a high ratio. The resultant extruded foam exhibited a higher deflection in bending fracture than the extruded foam prepared from the styrenic resin (B) and the resin (A1) alone (Example 2), and equivalent mechanical strength to the extruded foam composed basically of a styrenic resin (B) alone (Comparative Example 1).

The extruded foams of Examples 24, 25 and 27 to 31 also exhibited a higher deflection in bending fracture than the extruded foam of Example 26. In particular, the extruded foam of Examples 25 and 29 to 31 exhibited an equivalent or higher deflection in bending fracture than the extruded foam of Comparative Example 16.

In particular, in Examples 35 to 43, the (meth)acrylic ester component in the styrenic resin mixture, which is base resin composing the extruded styrenic resin foam, is within a specific range, and the resin (A) in the styrenic resin mixture is dispersed in layers in the styrenic resin (B) matrix. Therefore, the extruded foams exhibited lower thermal conductivity than the foam of Example 44 in which the resin (A) is not dispersed in layers, and provided mechanical properties equivalent to those of Comparative Example 17.

Figure 2:
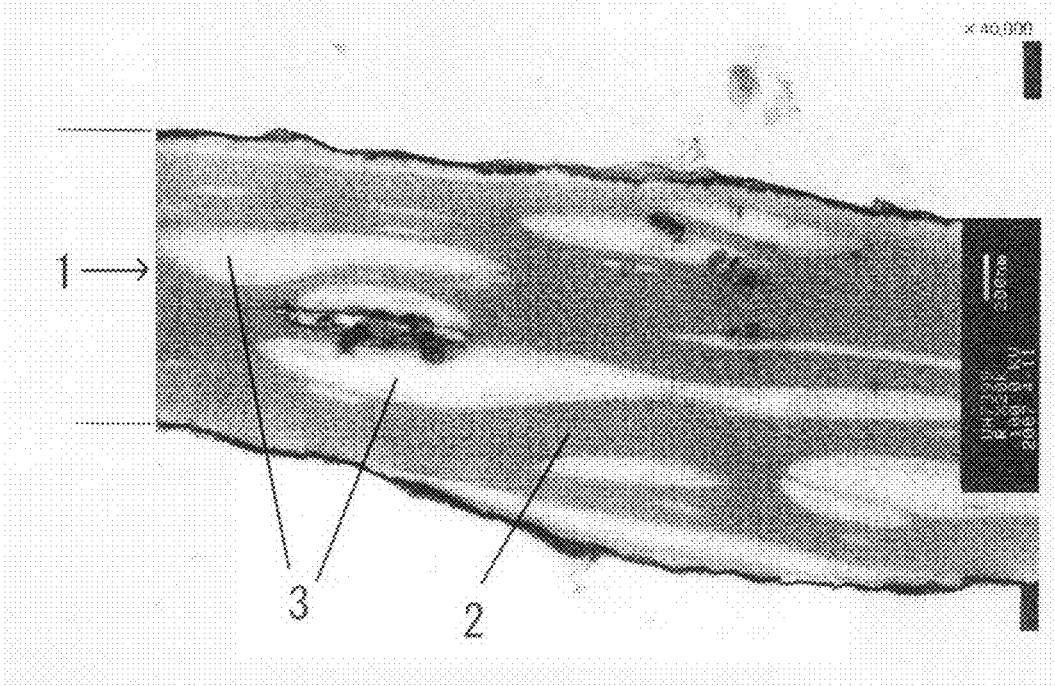
FIG. 2 is a transmission electron micrograph (magnification: 40,000) showing the section of the cell membranes of the foam obtained in Example 26.
Figure 3:
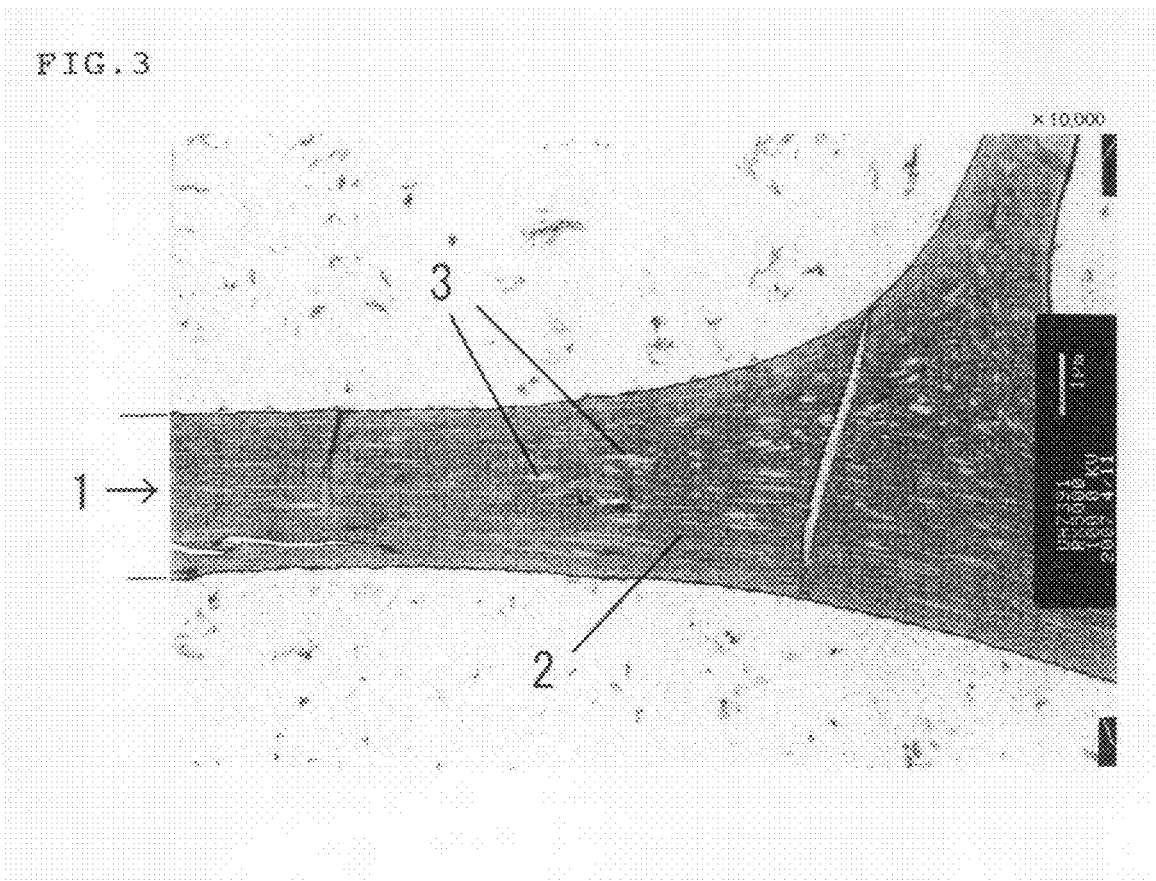
FIG. 3 is a transmission electron micrograph (magnification: 10,000) showing the section of the cell membranes of the foam obtained in Example 25.

The dispersion conditions of the styrenic resin (B) and resin (A) in the extruded foam of the present invention were observed with a transmission electron microscope. FIGS. 1 and 2 are micrographs of the section of the cell membrane region of the foam of Example 26 wherein a styrene-(meth) acrylic ester copolymer containing a (meth)acrylic ester component at a high ratio (resin (A1)) was mixed with the styrenic resin (B), and FIGS. 3 and 4 are micrographs of the section of the cell membrane region of the foam of Example 25 wherein a styrene-(meth)acrylic ester copolymer containing a (meth)

acrylic ester component at high ratio (resin (A1)) and low ratio (resin (A2)) was mixed with the styrenic resin (B). FIGS. 1 and 3 were taken at a magnification of 10,000, and FIGS. 2 and 4 were taken at a magnification of 40,000.

Figure 5:
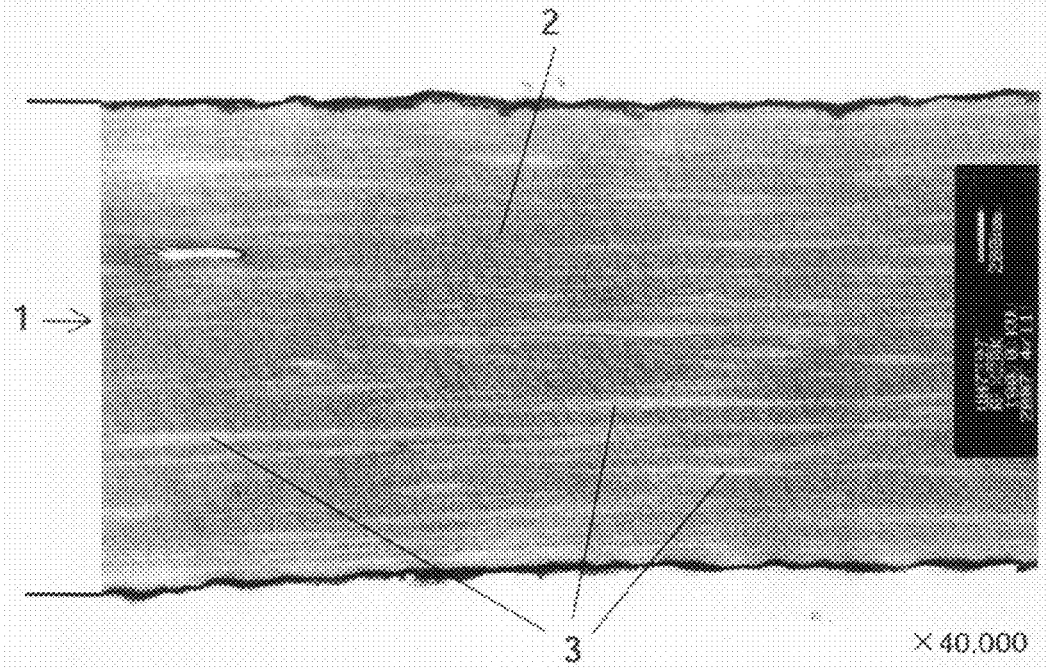
FIG. 5 is a transmission electron micrograph (magnification: 40,000) showing the section of the cell membranes of the foam obtained in Example 35.
Figure 6:
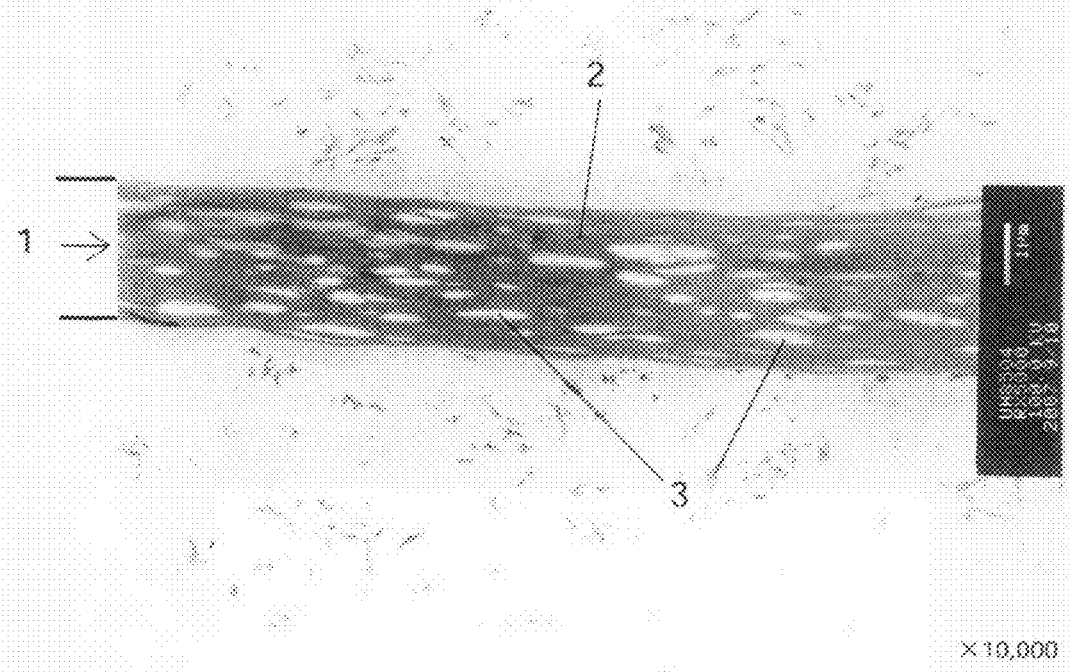
FIG. 6 is a transmission electron micrograph (magnification: 10,000) showing the section of the cell membranes of the foam obtained in Example 38.
Figure 7:
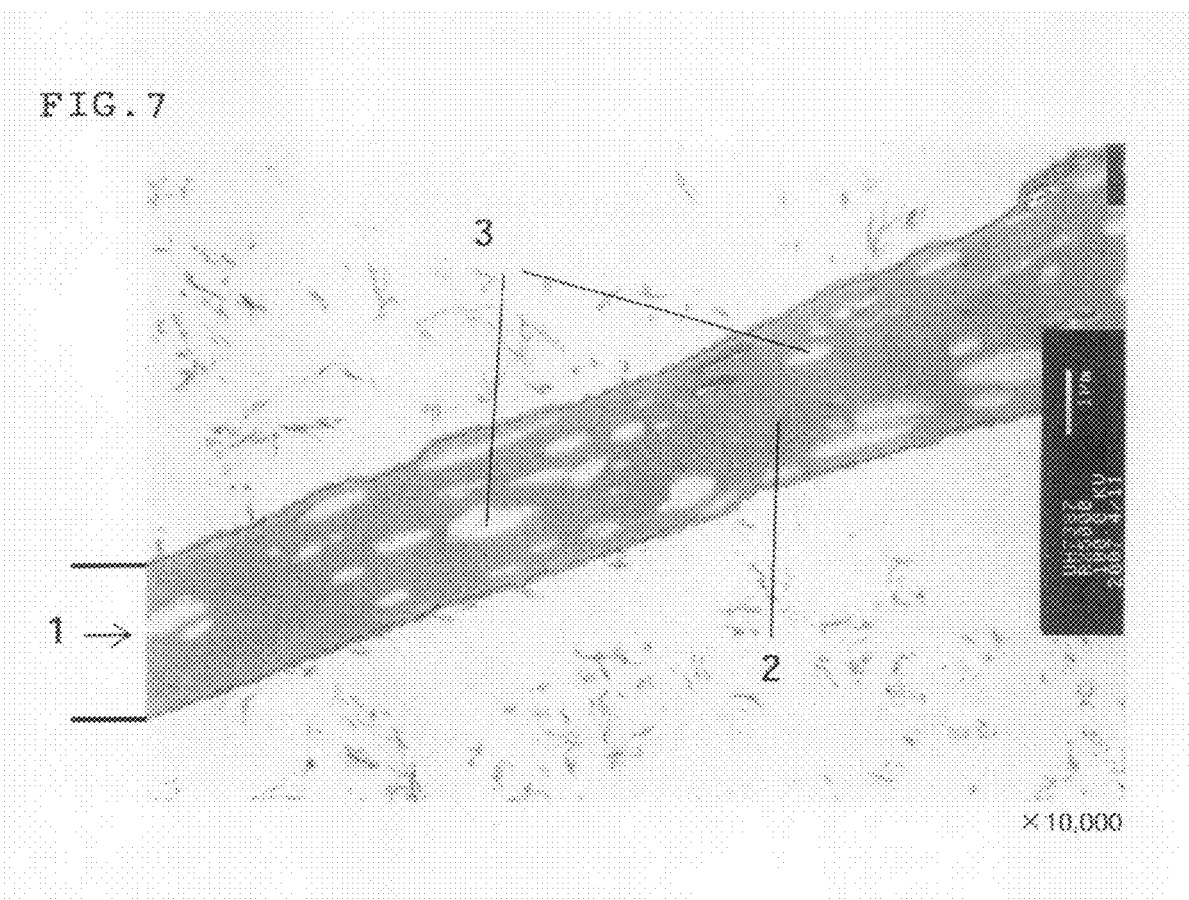
FIG. 7 is a transmission electron micrograph (magnification: 10,000) showing the section of the cell membranes of the foam obtained in Example 44.

FIGS. 5, 6 and 7 are micrographs of the section of the cell membrane region of the foams of Examples 35, 38 and 45 taken at magnifications of 40,000, 10,000 and 10,000, respectively.

In the figures, reference numeral 1 denotes a cell membrane of the foam. The styrenic resin (B) and resin (A) form a sea-island structure, and the "sea" areas (dense black areas) denoted by the reference numeral 2 are the styrenic resin (B), and the "island" area (light white areas) denoted by the reference numeral 3 are the resin (A). These micrographs indicate that the resin (A) is more finely dispersed in the styrenic resin (B) matrix when it is dispersed together with the resin (A2) (Examples 25, 26). This is likely the reason that the extruded foam of Example 25 exhibited better bend properties than that of Example 26.

When the resin (A) is dispersed in layers in the styrenic resin (B) (FIGS. 5 and 6), the foam has lower thermal conductivity and better mechanical properties than the foam in which the resin (A) is not dispersed in layers, or scattered in granular form in the styrenic resin (B) matrix (FIG. 7), even if the amounts of the (meth)acrylic ester component in the styrenic resin mixtures are the same.

Comparative Example 1 was compared with Examples 1 to 9, and Example 23. In Comparative Example 1, no resin (A) was mixed with the styrenic resin, so that the resultant extruded foam exhibited a higher thermal conductivity than the extruded foams prepared with addition of the resin (A).

Comparative Example 2 was compared with Examples 1 to 4. In Comparative Example 2, the content of the (meth)acrylic ester component in the styrenic resin mixture was too low to decrease the thermal conductivity of the molded product.

Comparative Example 3 was compared with Examples 1 to 4. In Comparative Example 3, the content of the (meth)acrylic ester component in the styrenic resin mixture was so high that, though the thermal conductivity of the molded product was sufficiently decreased, the flame retardancy defined in JIS A 9511 (2006), Measurement Method A was not satisfied even though the amount of the flame retardant was increased.

Comparative Example 4 was compared with Examples 1 to 4. In Comparative Example 4, the styrene-(meth)acrylic ester copolymer as the resin (A) was used alone, so that the thermal conductivity of the foam was less reduced than that of the foam composed of the mixture of the styrene-(meth)acrylic ester copolymer and the styrenic resin (B), regardless the high content of the (meth)acrylic ester component. In addition, the content of the (meth)acrylic ester component was so high that the flame retardancy defined in JIS A 9511 (2006), Measurement Method A was not satisfied even though the amount of the flame retardant was increased.

Comparative Example 5 was compared with Example 2. In Comparative Example 5, polymethyl methacrylate as the resin (A) was mixed with a styrenic resin (B) without a styrene-(meth)acrylic ester copolymer. Polymethyl methacrylate contained no styrene monomer unit, so that its compatibility with the styrenic resin was very poor. This caused the deterioration of the foaming properties, and the failure to produce a good foam.

Comparative Example 6 was compared with Example 10, Comparative Example 7 was compared with Examples 11 and 26, Comparative Example 8 was compared with Example 12, Comparative Example 9 was compared Examples 13 and 14, Comparative Example 10 was compared with Example 15, Comparative Example 11 was compared with Example 16, Comparative Example 12 was compared with Examples 17 and 18, Comparative Example 13 was compared with Example 19, Comparative Example 14 was compared with Example 20, Comparative Example 15 was compared with Examples 21 and 22, Comparative Example 16 was compared with Examples 24 to 34, and Comparative Example 17 was compared with Examples 35 to 45. In Comparative Examples, no resin (A) was mixed with the styrenic resin (B). No resin (A) was added in Comparative Examples 6 to 17, so that the thermal conductivity of the resultant foam was higher than the foams produced with the addition of the resin (A).

What is claimed is:

1. A method for producing an extruded styrenic resin foam as a building insulating board, comprising melting and mixing a styrenic resin mixture, a blowing agent, and a flame retardant to make a foamable molten resin composition, extruding and foaming the foamable molten resin composition to obtain an extruded foam having an apparent density of 22 to 50 kg/m$^3$ and a thickness of 10 to 150 mm, wherein the styrenic resin mixture is composed of a mixture of a resin (A) and a styrenic resin (B), wherein the resin (A) consists of a resin (A1) composed of a polymethyl methacrylate and/or styrene-methyl methacrylate copolymer containing a methyl methacrylate component at a ratio of 40% by weight or more, and a resin (A2), different from resin (A1), composed of a styrene-methyl methacrylate copolymer containing a methyl methacrylate component at a ratio of 5% by weight or more and less than 40% by weight, and the content of a methyl methacrylate component in the styrenic resin mixture is 4 to 45% by weight with reference to the styrenic resin mixture.

2. The method for producing an extruded styrenic resin foam according to claim 1, wherein the content of the methyl methacrylate component in the styrenic resin mixture is 10 to 30% by weight with reference to the styrenic resin mixture.

3. The method for producing an extruded styrenic resin foam according to claim 1, wherein the content of the methyl methacrylate component in the styrenic resin mixture is 12 to 25% by weight with reference to the styrenic resin mixture.

4. The method for producing an extruded styrenic resin foam according to claim 1, wherein the styrenic resin mixture is composed of 10 to 80% by weight of the resin (A) and 20 to 90% by weight of the styrenic resin (B), wherein the total of (A) and (B) is 100% by weight.

5. The method for producing an extruded styrenic resin foam according to claim 1, wherein the styrenic resin mixture is composed of 10 to 60% by weight of the resin (A) and 40 to 90% by weight of the styrenic resin (B), wherein the total of (A) and (B) is 100% by weight.

6. The method for producing an extruded styrenic resin foam according to claim 1, wherein the content of the methyl methacrylate component in the resin (A) is 25 to 80% by weight.

7. The method for producing an extruded styrenic resin foam according to claim 1, wherein the content of the methyl methacrylate component in the resin (A) is 40 to 75% by weight.

8. The method for producing an extruded styrenic resin foam according to claim 1, wherein the resin (A1) contains the methyl methacrylate component at a ratio of 40 to 75% by weight, and the resin (A2) contains the methyl methacrylate component at a ratio of 5% by weight or more and less than 40% by weight.

9. The method for producing an extruded styrenic resin foam according to claim 1, wherein the resin (A1) contains the methyl methacrylate component at a ratio of 40 to 75% by weight, and the resin (A2) contains the methyl methacrylate component at a ratio of 15 to 25% by weight.

10. The method for producing an extruded styrenic resin foam according to claim 1, wherein the weight ratio between the resin (A1) and the resin (A2) is 90:10 to 50:50.

11. The method for producing an extruded styrenic resin foam according to claim 1, wherein the weight ratio between the resin (A1) and the resin (A2) is 70:30 to 60:40.

12. The method for producing an extruded styrenic resin foam according to claim 1, wherein the blowing agent is at least one selected from aliphatic hydrocarbons having 3 to 5 carbon atoms, alicyclic hydrocarbons having 3 to 6 carbon atoms, aliphatic alcohols having 1 to 4 carbon atoms, dialkyl ethers having an alkyl chain containing 1 to 3 carbon atoms, alkyl chlorides having 1 to 3 carbon atoms, carbon dioxide, and water.

13. An extruded styrenic resin foam, as a building insulating board, having a thickness of 10 to 150 mm and an apparent density of 22 to 50 kg/m$^3$, wherein a base resin composing the extruded styrenic resin foam is a styrenic resin mixture composed of a mixture of a resin (A) and a styrenic resin (B), wherein the resin (A) consists of a resin (A1) composed of a polymethyl methacrylate and/or styrene-methyl methacrylate copolymer containing a methyl methacrylate component at a ratio of 40% by weight or more, and a resin (A2), different from resin (A1), composed of a styrene-methyl methacrylate copolymer containing a methyl methacrylate component at a ratio of 5% by weight or more and less than 40% by weight, and the content of a methyl methacrylate component in the styrenic resin mixture is 4 to 45% by weight.

14. The extruded styrenic resin foam according to claim 13, wherein the content of the methyl methacrylate component in the styrenic resin mixture is 10 to 30% by weight.

15. The extruded styrenic resin foam according to claim 13, wherein the content of the methyl methacrylate component in the styrenic resin mixture is 12 to 25% by weight.

16. The extruded styrenic resin foam according to claim 13, wherein, in the section of the cell membrane region of the foam, the resin (A) is dispersed in the styrenic resin (B) matrix in layers.

17. The extruded styrenic resin foam according to claim 16, wherein, in the section of the cell membrane region of the foam, the average number of layers of the resin (A) having a length of 0.01 to 0.3 μm in the thickness direction of the cell membrane region is three or more in the thickness direction of the cell membrane.

18. The extruded styrenic resin foam according to claim 16, wherein, in the section of the cell membrane region of the foam, the abundance of the resin (A) having a length of 0.01 to 0.3 μm in the thickness direction of the cell membrane region is 90% or more in terms of number.

19. The extruded styrenic resin foam according to claim 13, wherein the resin (A1) contains the methyl methacrylate component at a ratio of 40 to 75% by weight, and the resin (A2) contains the methyl methacrylate component at a ratio of 5% by weight or more and less than 40% by weight.

20. The extruded styrenic resin foam according to claim 13, wherein the resin (A1) contains the methyl methacrylate component at a ratio of 40 to 75% by weight, and the resin (A2) contains the methyl methacrylate component at a ratio of 15 to 25% by weight.

21. The extruded styrenic resin foam according to claim 13, wherein the weight ratio between the resin (A1) and the resin (A2) is 50:50 to 90:10, and the content of the resin (A2) in the styrenic resin mixture is 5 to 20% by weight.

22. The extruded styrenic resin foam according to claim 13, wherein a relationship between the apparent density of the extruded styrenic resin foam and a content of a hydrocarbon having 3 to 5 carbon atoms in 1 kg of the extruded styrenic resin foam satisfies the following formula (1):

$$\rho \cdot \alpha \leq 30 \,[\text{mol/m}^3] \tag{1}$$

wherein $\rho$ is the apparent density [kg/m$^3$] of the extruded styrenic resin foam, and $\alpha$ is the content [mol/kg] of the hydrocarbon having 3 to 5 carbon atoms in 1 kg of the extruded styrenic resin foam.

* * * * *